US012731460B2

(12) United States Patent
Sanborn et al.

(10) Patent No.: US 12,731,460 B2
(45) Date of Patent: Sep. 8, 2026

(54) PERSISTENT SYMBOL POSITION ARRAYS WITH ARRAY GROWTH IN BOTH BASE GAME AND FEATURE GAME

(71) Applicant: Aristocrat Technologies, Inc., Las Vegas, NV (US)

(72) Inventors: Hanna Sanborn, Georgetown, TX (US); Jennifer Mizzi, Ewa Beach, HI (US); Jeffrey Uss, Liberty Hill, TX (US); Rogelio Decasa, Jr., Renton, WA (US); Nathan Warms, Austin, TX (US); Zachary Smith, Austin, TX (US); Erick Ching, Cedar Park, TX (US); Zachary Cohen, Chicago, IL (US); Kelly Lockheed, Elkridge, MD (US); Scott Hopkins, Austin, TX (US); Carlyn Albright, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 506 days.

(21) Appl. No.: 18/158,323

(22) Filed: Jan. 23, 2023

(65) Prior Publication Data

US 2023/0237877 A1 Jul. 27, 2023

Related U.S. Application Data

(60) Provisional application No. 63/303,931, filed on Jan. 27, 2022.

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC ............. G07F 17/3213; G07F 17/3258; G07F 17/3262; G07F 17/3267; G07F 17/34
See application file for complete search history.

(56) References Cited

U.S. PATENT DOCUMENTS

| | | | | |
|---|---|---|---|---|
| 6,544,120 | B2 | 4/2003 | Ainsworth | |
| 7,410,420 | B2 * | 8/2008 | Shiraishi | G07F 17/3211 463/31 |

(Continued)

OTHER PUBLICATIONS

Notice of Allowance dated Oct. 12, 2021 for U.S. Appl. No. 17/248,504 (pp. 1-10).

(Continued)

*Primary Examiner* — Chase E Leichliter
(74) *Attorney, Agent, or Firm* — Weaver Austin Villeneuve & Sampson LLP

(57) ABSTRACT

Electronic gaming machines and systems are disclosed that provide for a symbol-based main game that features an array of symbol positions that may, if an array growth condition is met, increase in size. Determining whether the array growth condition is met may involve determining how many array growth symbols are shown in association with a game play. A further determination may be made as to whether a feature game trigger condition is met and, if so, a feature game may be presented that utilizes the same array of symbol positions that were present in the main game when the feature game was triggered. Additional array growth may occur in the feature game if the array growth condition is met again.

20 Claims, 20 Drawing Sheets

(56) References Cited

U.S. PATENT DOCUMENTS 8,602,868 B2 12/2013 Johnson
8,795,059 B2 8/2014 Aoki
9,483,900 B2 11/2016 Aoki
9,652,933 B2 5/2017 Johnson
9,704,332 B2 7/2017 Guerrero
9,805,541 B2 10/2017 Pawloski
9,805,557 B2 10/2017 Schmidt
9,870,672 B2 1/2018 Guerrero
10,186,107 B2 1/2019 Kitamura
10,249,142 B2 4/2019 Schmidt
10,255,751 B2 4/2019 Boese
10,522,005 B2 * 12/2019 Wortmann .......... G07F 17/3269
10,546,452 B2 1/2020 Kennedy
10,706,664 B2 7/2020 Boese
10,957,147 B1 3/2021 Knight
11,120,667 B2 * 9/2021 Honeycutt .......... G07F 17/3269
11,257,327 B1 * 2/2022 Sanborn .............. G07F 17/3213
11,645,892 B2 5/2023 Sanborn
11,688,247 B2 * 6/2023 Honeycutt .......... G07F 17/3269 463/25
11,983,995 B2 5/2024 Sanborn
12,249,220 B2 * 3/2025 Sanborn .............. G07F 17/3258
2002/0014740 A1 * 2/2002 Ainsworth .......... G07F 17/3244 273/139
2002/0055382 A1 * 5/2002 Meyer ..................... G07F 17/34 463/20
2003/0153385 A1 * 8/2003 Ikeya ...................... G07F 17/32 463/31
2004/0072612 A1 * 4/2004 Rodgers .............. G07F 17/3244 463/20
2005/0070354 A1 * 3/2005 Baerlocher ......... G07F 17/3267 463/20
2005/0159208 A1 * 7/2005 Pacey ................. G07F 17/3211 463/20
2006/0079319 A1 * 4/2006 Aoki ................... G07F 17/3225 463/25
2006/0247002 A1 * 11/2006 Yoshimi .................. G07F 17/34 463/20
2007/0060248 A1 * 3/2007 Rodgers .................. G07F 17/32 463/16
2007/0232383 A1 * 10/2007 Berman .................. G07F 17/34 463/20
2008/0070672 A1 * 3/2008 Inamura .................. G07F 17/34 463/20
2009/0227345 A1 * 9/2009 Yoshizawa .......... G07F 17/3244 463/20
2009/0227351 A1 * 9/2009 Yoshizawa .............. G07F 17/34 463/20
2010/0075741 A1 * 3/2010 Aoki ................... G07F 17/3202 463/20
2010/0273550 A1 * 10/2010 Marks ..................... G07F 17/34 463/20
2012/0122547 A1 * 5/2012 Aoki ....................... G07F 17/34 463/20
2013/0065663 A1 * 3/2013 Johnson .............. G07F 17/3213 463/20
2013/0102375 A1 * 4/2013 Aoki ................... G07F 17/3213 463/20
2013/0344939 A1 * 12/2013 Aoki ................... G07F 17/3288 463/21
2014/0162749 A1 * 6/2014 Ryan ................... G07F 17/3213 463/20
2014/0274288 A1 * 9/2014 Hornik .................. G07F 17/326 463/20
2015/0018070 A1 * 1/2015 Meyer ................... G07F 17/326 463/20
2015/0031437 A1 * 1/2015 Gomez ............... G07F 17/3213 463/20
2015/0057068 A1 * 2/2015 Burghard ............ G07F 17/3213 463/20
2015/0087393 A1 * 3/2015 Jaffe ....................... G07F 17/34 463/20
2015/0161853 A1 * 6/2015 Ryan ....................... G07F 17/34 463/20
2016/0125688 A1 * 5/2016 Hoffman ................. G07F 17/34 463/20
2016/0133094 A1 * 5/2016 Thomas .............. G07F 17/3246 463/20
2016/0232743 A1 * 8/2016 Thomas .............. G07F 17/3213
2016/0358412 A1 * 12/2016 Eaton .................. G07F 17/3267
2017/0024957 A1 * 1/2017 Boese ................. G07F 17/3213
2017/0084113 A1 * 3/2017 Sanders .............. G07F 17/3209
2017/0092050 A1 3/2017 Kitamura
2017/0193756 A1 7/2017 Schmidt
2018/0025585 A1 * 1/2018 Schmidt .............. G07F 17/3211 463/20
2018/0061174 A1 * 3/2018 Boese ................. G07F 17/3244
2018/0061176 A1 * 3/2018 Berman .............. G07F 17/3213
2018/0089931 A1 * 3/2018 Hawkins ............. G07F 17/3246
2018/0225926 A1 * 8/2018 Wortmann .......... G07F 17/3267
2019/0051099 A1 * 2/2019 Pawloski ............ G07F 17/3211
2019/0295376 A1 * 9/2019 Ludwick ................. G07F 17/34
2019/0304244 A1 * 10/2019 Kennedy ............. G07F 17/3244
2019/0371117 A1 12/2019 Hiten
2020/0105090 A1 4/2020 Caputo
2020/0250923 A1 8/2020 Ceniceroz
2020/0265680 A1 8/2020 Chan
2021/0082252 A1 * 3/2021 Honeycutt .......... G07F 17/3269
2021/0097820 A1 4/2021 Lombardo
2021/0256812 A1 * 8/2021 Kearns ................ G07F 17/3213
2021/0335099 A1 * 10/2021 Meyer ..................... G07F 17/34
2021/0398393 A1 * 12/2021 Honeycutt .......... G07F 17/3244
2022/0254225 A1 8/2022 Ceniceroz
2022/0335776 A1 * 10/2022 Mirjavadi ........... G07F 17/3213
2023/0237877 A1 * 7/2023 Sanborn ................ G07F 17/326 463/25
2023/0274617 A1 * 8/2023 Honeycutt .......... G07F 17/3244 463/25
2024/0257614 A1 * 8/2024 Sanborn .............. G07F 17/3267
2024/0339008 A1 * 10/2024 Meyer ................. G07F 17/3267

OTHER PUBLICATIONS

Office Action (Non-Final Rejection) dated Sep. 22, 2022 for U.S. Appl. No. 17/647,681 (pp. 1-6).
Office Action (Notice of Allowance and Fees Due (PTOL-85)) dated Dec. 28, 2022 for U.S. Appl. No. 17/647,681 (pp. 1-5).
Office Action (Notice of Allowance and Fees Due (PTOL-85)) dated Feb. 14, 2024 for U.S. Appl. No. 18/314,018 (pp. 1-8).
Office Action (Notice of Allowance and Fees Due (PTOL-85)) dated Dec. 5, 2024 for U.S. Appl. No. 18/632,150 (pp. 1-7).

* cited by examiner

| Per-Expansion State RTP Contribution | | | | |
|---|---|---|---|---|
| Expansion State | Payout Mechanism RTP Contribution | | | Total RTP |
| | Base Game | Free Game | Hold & Spin | |
| 3x5 | 65% | 20% | 10% | 95% |
| 4x5 | 65% | 15% | 15% | 95% |
| 5x5 | 65% | 10% | 20% | 95% |
| 6x5 | 65% | 5% | 25% | 95% |

Table A

| Percent of Game Play in Each Expansion State | |
|---|---|
| Expansion State | % of spins |
| 3x5 | 40.00% |
| 4x5 | 20.00% |
| 5x5 | 30.00% |
| 6x5 | 10.00% |

Table B

| Scaled RTP Contribution | | | | |
|---|---|---|---|---|
| Expansion State | Payout Mechanism RTP Contribution | | | Total RTP |
| | Base Game | Free Game | Hold & Spin | |
| 3x5 | 26.00% | 8.00% | 4.00% | 38.00% |
| 4x5 | 13.00% | 3.00% | 3.00% | 19.00% |
| 5x5 | 19.50% | 3.00% | 6.00% | 28.50% |
| 6x5 | 6.50% | 0.50% | 2.50% | 9.50% |
| Total RTP | 65.00% | 14.50% | 15.50% | 95.00% |

Table C

| Expansion State | Hit Rate | |
|---|---|---|
| | Free Game | Hold & Spin |
| 3x5 | 60.00 | 150.00 |
| 4x5 | 75.00 | 100.00 |
| 5x5 | 100.00 | 75.00 |
| 6x5 | 150.00 | 60.00 |

Table D

| Expansion State | Scaled Hit Rates | |
|---|---|---|
| | Free Game | Hold & Spin |
| 3x5 | 24 | 60 |
| 4x5 | 15 | 20 |
| 5x5 | 30 | 22.5 |
| 6x5 | 15 | 6 |

Table E

| Final Hit Rates | |
|---|---|
| Free Game | Hold & Spin |
| 84 | 108.5 |
| Any Feature | 47.34545455 |

Table F

FIG. 18

PERSISTENT SYMBOL POSITION ARRAYS WITH ARRAY GROWTH IN BOTH BASE GAME AND FEATURE GAME

RELATED APPLICATION(S)

This application claims benefit of priority under 35 U.S.C. § 119(e) to U.S. Patent Application No. 63/303,931, filed Jan. 27, 2022, and titled "PERSISTENT SYMBOL POSITION ARRAYS WITH ARRAY GROWTH IN BOTH BASE GAME AND FEATURE GAME" and is related to U.S. application Ser. No. 17/248,504, filed Jan. 27, 2021, and Ser. No. 17/647,681, filed Jan. 11, 2022, both also titled "PERSISTENT SYMBOL POSITION ARRAYS WITH ARRAY GROWTH IN BOTH BASE GAME AND FEATURE GAME," all of which are hereby incorporated herein by reference in their entireties and for all purposes.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

The present disclosure is directed to various implementations in which a main game is configured to include an array growth feature that allows an array of symbol positions used to display symbols during game play of the main game to be increased in size in one dimension during game play responsive to satisfaction of an array growth condition. In such implementations, the main game is also configured to cause a feature game to be presented responsive to a feature game trigger condition being met—the feature game that is presented uses an array of symbol positions that has first and second dimensions that are the same as the first and second dimensions of the array of symbol positions in use in the main game at the time the feature game trigger condition was met.

In some implementations, a system may be provided that includes one or more displays and a game controller that includes one or more processors and one or more memory devices. The one or more processors, the one or more memory devices, and the one or more displays may be operably connected, and the one or more memory devices may store computer-executable instructions which, when executed, may control the one or more processors to cause an array of symbol positions to be displayed on the one or more displays. The array of symbol positions may be defined by a first dimension A and a second dimension B. The one or more memory devices may further store computer-executable instructions which, when executed, may further control the one or more processors to, responsive to each receipt of a first input signal indicative of a game play of a main game, select, in association with that game play of the main game, a symbol for each symbol position in the array of symbol positions from one of one or more sets of symbols associated with the main game; display, in each symbol position, the symbol selected for that symbol position in association with that game play of the main game; determine whether any of the symbols selected for display in association with that game play is an array growth symbol or are array growth symbols that, in being displayed, meet an array growth condition; cause, responsive to determining that the array growth condition is met, the second dimension of the array of symbol positions to increment by 1, thereby causing a quantity of additional symbol positions equal to the first dimension to be additionally displayed as part of the array of symbol positions, and additional symbols from the one set of symbols of the one or more sets of symbols to be displayed in the additionally displayed symbol positions; determine whether any of the symbols selected for display in association with that game play is a feature game trigger symbol or are feature game trigger symbols that, in being displayed, meet a feature game trigger condition; cause, responsive to determining that the feature game trigger condition is met, a feature game to be presented using the array of symbol positions, inclusive of any of the additionally displayed symbol positions; and determine, responsive to receipt of one or more second input signals and in association with the presentation of the feature game, an outcome of the feature game, wherein each second input signal is indicative of a feature game play of the feature game.

In some such implementations, the feature game may be a hold and spin game that causes symbols to be displayed in the array of symbol positions, inclusive of any additionally displayed symbol positions.

In some implementations, the one or more memory devices may store further computer-executable instructions which, when executed, may further control the one or more processors to, responsive to each receipt of the second input signal indicative of a feature game play of the feature game, select, in association with that feature game play, a symbol for at least each symbol position in the array of symbol positions that does not display a feature game symbol from one of one or more sets of symbols associated with the feature game; display, in each symbol position in the array of symbol positions that does not display a feature game symbol and for that feature game play, the symbol selected for that symbol position in association with that feature game play; determine whether any of the symbols selected for display in association with that feature game play is an array growth symbol or are array growth symbols that, in being displayed, meet the array growth condition; cause, responsive to determining that the array growth condition is met, the second dimension of the array of symbol positions to increment by 1, thereby causing a quantity of additional symbol positions equal to the first dimension to be additionally displayed as part of the array of symbol positions, and additional symbols from the one set of symbols of the one or more sets of symbols to be displayed in the additionally displayed symbol positions; identify any symbols that are newly displayed as a result of that feature game play that are a feature game symbol; decrement, responsive to determining that the identified feature game symbols for that feature game play, if any, do not meet a remaining play counter reset condition, a remaining play counter; and increment, responsive to determining that the identified feature game symbols for that feature game play, if any, meet the remaining play counter reset condition, the remaining play counter by 0 or more units.

In some such implementations, the feature game symbols and the feature game trigger symbols may be the same symbols and may be displayed in the same symbol positions in the array of symbol positions when the feature game is presented responsive to the feature game trigger condition being met as they were in the main game when the feature game trigger condition was met.

In some implementations, the one or more memory devices may store further computer-executable instructions which, when executed, may further control the one or more processors to determine, responsive to receipt of one of the one or more second input signals, that the feature game has concluded, and reset, in association with the conclusion of the feature game, the array of symbol positions to a default size that does not include any symbol positions that were added responsive to the array growth condition being met.

In some implementations, each set of symbols may be divided into multiple subsets of symbols, the array of symbol positions may include a plurality of sets of symbol positions, the symbol positions in each set of symbol positions may be associated with array positions that have a corresponding common index value for the first dimension of the array, and the symbols selected for symbol positions in each set of symbol positions may be selected from a corresponding one of the subsets of symbols.

In some implementations, the symbols in each subset of symbols may be associated with information that defines a predetermined sequence for those symbols in which a first symbol in the predetermined sequence is treated as being sequentially adjacent to both a second symbol in the predetermined sequence and a last symbol in the predetermined sequence and in which the last symbol in the predetermined sequence is treated as being sequentially adjacent to both the first symbol in the predetermined sequence and a penultimate symbol in the predetermined sequence. In such implementations, the one or more memory devices may store further computer-executable instructions which, when executed, further control the one or more processors to select the symbols for each set of symbol positions such that the selected symbols, when displayed in those symbol positions, are displayed in an order that is consistent with the predetermined sequence of the symbols in the corresponding subset for that set of symbol positions and such that the symbols from the corresponding subset are sequentially adjacent within the predetermined sequence.

In some such implementations, the one or more memory devices may store further computer-executable instructions which, when executed, further control the one or more processors to cause the second dimension B of the array to not exceed a predetermined maximum value X.

In some further such implementations, the predetermined sequence of symbols for at least one of the subsets of symbols may include at least one instance of X or more sequentially adjacent feature game trigger symbols.

In some additional or alternative such implementations, the feature game trigger condition may be that the feature game trigger symbols are displayed in X or more symbol positions of the array of symbol positions.

In some implementations, a method is provided that includes controlling one or more processors to cause an array of symbol positions to be displayed on one or more displays. The array of symbol positions may be defined by a first dimension A and a second dimension B. The method may further include receiving one or more first input signals by the one or more processors, each indicative of a game play of a main game, and, responsive to each receipt thereof, selecting, in association with that game play of the main game and by the one or more processors, a symbol for each symbol position in the array of symbol positions from one of one or more sets of symbols associated with the main game; causing, by the one or more processors, the display, in each symbol position, of the symbol selected for that symbol position in association with that game play of the main game; determining, by the one or more processors, whether any of the symbols selected for display in association with that game play is an array growth symbol or are array growth symbols that, in being displayed, meet an array growth condition; causing, responsive to determining that the array growth condition is met and by the one or more processors, the second dimension of the array of symbol positions to increment by 1, thereby causing a quantity of additional symbol positions equal to the first dimension to be additionally displayed as part of the array of symbol positions, and additional symbols from the one set of symbols of the one or more sets of symbols to be displayed in the additionally displayed symbol positions; determining, by the one or more processors, whether any of the symbols selected for display in association with that game play is a feature game trigger symbol or are feature game trigger symbols that, in being displayed, meet a feature game trigger condition; causing, responsive to determining that the feature game trigger condition is met and by the one or more processors, a feature game to be presented using the array of symbol positions, inclusive of any of the additionally displayed symbol positions, and determining, responsive to receipt of one or more second input signals, in association with the presentation of the feature game, and by the one or more processors, an outcome of the feature game, wherein each second input signal is indicative of a feature game play of the feature game.

In some implementations, the feature game may be a hold and spin game in which symbols are displayed in the array of symbol positions, inclusive of any additionally displayed symbol positions.

In some implementations, the method may further include, responsive to each receipt of the second input signal indicative of a feature game play of the feature game, selecting, in association with that feature game play and by the one or more processors, a symbol for at least each symbol position in the array of symbol positions that does not display a feature game symbol from one of one or more sets of symbols associated with the feature game; causing, by the one or more processors, the display, in each symbol position in the array of symbol positions that does not display a feature game symbol and for that feature game play, the symbol selected for that symbol position in association with that feature game play; determining, by the one or more processors, that at least one of the symbols selected for display in association with that feature game play is an array growth symbol or are array growth symbols that, in being displayed, meet the array growth condition; causing, responsive to determining that the array growth condition is met and by the one or more processors, the second dimension of the array of symbol positions to increment by 1, thereby causing a quantity of additional symbol positions equal to the first dimension to be additionally displayed as part of the array of symbol positions, and additional symbols from the one set of symbols of the one or more sets of symbols to be displayed in the additionally displayed symbol positions; identifying, by the one or more processors, any symbols that are newly displayed as a result of that feature game play that are a feature game symbol; decrement, by the one or more processors and responsive to determining that the identified feature game symbols for that feature game play, if any, do not meet a remaining play counter reset condition, a remaining play counter, and increment, by the one or more processors and responsive to determining that the identified feature game symbols for that feature game play, if any, meet the remaining play counter reset condition, the remaining play counter by 0 or more units.

In some implementations, the feature game symbols and the feature game trigger symbols may be the same symbols and may be displayed in the same symbol positions in the array of symbol positions when the feature game is presented responsive to the feature game trigger condition being met as they were in the main game when the feature game trigger condition was met.

In some implementations, the method may further include determining, responsive to receipt of one of the one or more second input signals and by the one or more processors, that the feature game has concluded, and resetting, in association with the conclusion of the feature game and by the one or more processors, the array of symbol positions to a default size that does not include any symbol positions that were added responsive to the array growth condition being met.

In some implementations, each set of symbols may be divided into multiple subsets of symbols, the array of symbol positions may include a plurality of sets of symbol positions, the symbol positions in each set of symbol positions may be associated with array positions that have a corresponding common index value for the first dimension of the array, and the symbols selected for symbol positions in each set of symbol positions may be selected from a corresponding one of the subsets of symbols.

In some such implementations, the symbols in each subset of symbols may be associated with information that defines a predetermined sequence for those symbols in which a first symbol in the predetermined sequence is treated as being sequentially adjacent to both a second symbol in the predetermined sequence and a last symbol in the predetermined sequence and in which the last symbol in the predetermined sequence is treated as being sequentially adjacent to both the first symbol in the predetermined sequence and a penultimate symbol in the predetermined sequence. In such implementations, the method may further include selecting, by the one or more processors, the symbols for each set of symbol positions such that the selected symbols, when displayed in those symbol positions, are displayed in an order that is consistent with the predetermined sequence of the symbols in the corresponding subset for that set of symbol positions and such that the symbols from the corresponding subset are sequentially adjacent within the predetermined sequence.

In some such implementations, the method may further include causing, by the one or more processors, the second dimension B of the array to not exceed a predetermined maximum value X.

In some further such implementations, the predetermined sequence of symbols for at least one of the subsets of symbols may include at least one instance of X or more sequentially adjacent feature game trigger symbols.

In some additional or alternative such, implementations, the feature game trigger condition may be that the feature game trigger symbols are displayed in X or more symbol positions of the array of symbol positions.

In some implementations, a non-transitory, computer-readable medium may be provided that stores computer-executable instructions which, when executed by one or more processors, control the one or more processors to cause an array of symbol positions to be displayed on one or more displays. The array of symbol positions may be defined by a first dimension A and a second dimension B. The non-transitory, computer-readable medium may further store additional computer-executable instructions which, when executed by one or more processors, further control the one or more processors to, responsive to each receipt of a first input signal indicative of a game play of a main game, select, in association with that game play of the main game, a symbol for each symbol position in the array of symbol positions from one of one or more sets of symbols associated with the main game; display, in each symbol position, the symbol selected for that symbol position in association with that game play of the main game; determine whether any of the symbols selected for display in association with that game play is an array growth symbol or are array growth symbols that, in being displayed, meet an array growth condition; cause, responsive to determining that the array growth condition is met, the second dimension of the array of symbol positions to increment by 1, thereby causing a quantity of additional symbol positions equal to the first dimension to be additionally displayed as part of the array of symbol positions, and additional symbols from the one set of symbols of the one or more sets of symbols to be displayed in the additionally displayed symbol positions; determine whether any of the symbols selected for display in association with that game play is a feature game trigger symbol or are feature game trigger symbols that, in being displayed, meet a feature game trigger condition; cause, responsive to determining that the feature game trigger condition is met, a feature game to be presented using the array of symbol positions, inclusive of any of the additionally displayed symbol positions; and determine, responsive to receipt of one or more second input signals and in association with the presentation of the feature game, an outcome of the feature game, wherein each second input signal is indicative of a feature game play of the feature game.

In some implementations, the feature game may be a hold and spin game that causes symbols to be displayed in the array of symbol positions, inclusive of any additionally displayed symbol positions.

In some implementations, the non-transitory, computer-readable medium may further store additional computer-executable instructions which, when executed by one or more processors, may further control the one or more processors to, responsive to each receipt of the second input signal indicative of a feature game play of the feature game, select, in association with that feature game play, a symbol for at least each symbol position in the array of symbol positions that does not display a feature game symbol from one of one or more sets of symbols associated with the feature game; display, in each symbol position in the array of symbol positions that does not display a feature game symbol and for that feature game play, the symbol selected for that symbol position in association with that feature game play; determine whether any of the symbols selected for display in association with that feature game play is an array growth symbol or are array growth symbols that, in being displayed, meet the array growth condition; cause, responsive to determining that the array growth condition is met, the second dimension of the array of symbol positions to increment by 1, thereby causing a quantity of additional symbol positions equal to the first dimension to be additionally displayed as part of the array of symbol positions, and additional symbols from the one set of symbols of the one or more sets of symbols to be displayed in the additionally displayed symbol positions; identify any symbols that are newly displayed as a result of that feature game play that are a feature game symbol; decrement, responsive to determining that the identified feature game symbols for that feature game play, if any, do not meet a remaining play counter reset condition, a remaining play counter; and increment, responsive to determining that the identified feature game symbols for that feature game play, if any, meet the remaining play counter reset condition, the remaining play counter by 0 or more units.

In some such implementations, the feature game symbols and the feature game trigger symbols may be the same symbols and may be caused by the computer-executable instructions to be displayed in the same symbol positions in the array of symbol positions when the feature game is presented responsive to the feature game trigger condition being met as they were in the main game when the feature game trigger condition was met.

In some implementations, the non-transitory, computer-readable medium may further store additional computer-executable instructions which, when executed by one or more processors, may further control the one or more processors to, determine, responsive to receipt of one of the one or more second input signals, that the feature game has concluded, and reset, in association with the conclusion of the feature game, the array of symbol positions to a default size that does not include any symbol positions that were added responsive to the array growth condition being met.

In some implementations, each set of symbols may be divided into multiple subsets of symbols, the array of symbol positions may include a plurality of sets of symbol positions, the symbol positions in each set of symbol positions may be associated with array positions that have a corresponding common index value for the first dimension of the array, and the symbols selected for symbol positions in each set of symbol positions may be selected from a corresponding one of the subsets of symbols.

In some such implementations, the symbols in each subset of symbols may be associated with information that defines a predetermined sequence for those symbols in which a first symbol in the predetermined sequence is treated as being sequentially adjacent to both a second symbol in the predetermined sequence and a last symbol in the predetermined sequence and in which the last symbol in the predetermined sequence is treated as being sequentially adjacent to both the first symbol in the predetermined sequence and a penultimate symbol in the predetermined sequence. In such implementations, the non-transitory, computer-readable medium may further store additional computer-executable instructions which, when executed by one or more processors, may further control the one or more processors to select the symbols for each set of symbol positions such that the selected symbols, when displayed in those symbol positions, are displayed in an order that is consistent with the predetermined sequence of the symbols in the corresponding subset for that set of symbol positions and such that the symbols from the corresponding subset are sequentially adjacent within the predetermined sequence.

In some further such implementations, the non-transitory, computer-readable medium may further store additional computer-executable instructions which, when executed by one or more processors, may further control the one or more processors to cause the second dimension B of the array to not exceed a predetermined maximum value X.

In some such implementations, the predetermined sequence of symbols for at least one of the subsets of symbols may include at least one instance of X or more sequentially adjacent feature game trigger symbols.

In some additional or alternative such implementations, the feature game trigger condition may be that the feature game trigger symbols are displayed in X or more symbol positions of the array of symbol positions.

These and other implementations will be evident from the disclosure provided herein. The above-listed implementations are not an exclusive listing of implementations.

BRIEF DESCRIPTION OF THE DRAWINGS

FIG. 18 depicts several tables summarizing various parameters associated with an example game of chance that implements a strategy discussed herein.

DETAILED DESCRIPTION

The present disclosure is directed to various implementations in which a main game is configured to include an array growth feature that allows an array of symbol positions used to display symbols during game play of the main game to be increased in size in one dimension during game play responsive to satisfaction of an array growth condition. In such implementations, the main game is also configured to cause a feature game to be presented responsive to a feature game trigger condition being met—the feature game that is presented uses an array of symbol positions that has first and second dimensions that are the same as the first and second dimensions of the array of symbol positions in use in the main game at the time the feature game trigger condition was met. Such configurations are able to maintain player interest, and thus potential revenue streams resulting from game play, more effectively since a player that is playing the main game while the main game is displaying an increased-size array of symbol positions is will likely wish to continue playing knowing that a) their chances of triggering the feature game are likely increased due to the larger array size and b) that their chances of achieving a higher reward from the feature game, should it be triggered, will also be increased due to the increased array size. Moreover, such implementations may also allow for additional array growth during the feature game as well, thus building further on array growth that may occur during play of the main game.

The main games and feature games that are discussed below may both be described as being symbol-based games in which symbols are selected for display in an array of symbol positions presented to a player via a GUI as part of each play of the relevant game. Each symbol position is thus caused to display a corresponding symbol for each instance of game play. Various specific details of a variety of example implementations are discussed below with respect to the Figures.

Main/feature games with persistent arrays of symbol positions provide a new game play experience for players in which "improvements" (array growth) that occur in the main game may persist and carry over into the feature game should the feature game be triggered. At the same time, each improvement that occurs in the main game may increase the odds of further improvements and/or feature game triggering, which serves to incentivize the player and encourage them to keep playing.

Figure 1:
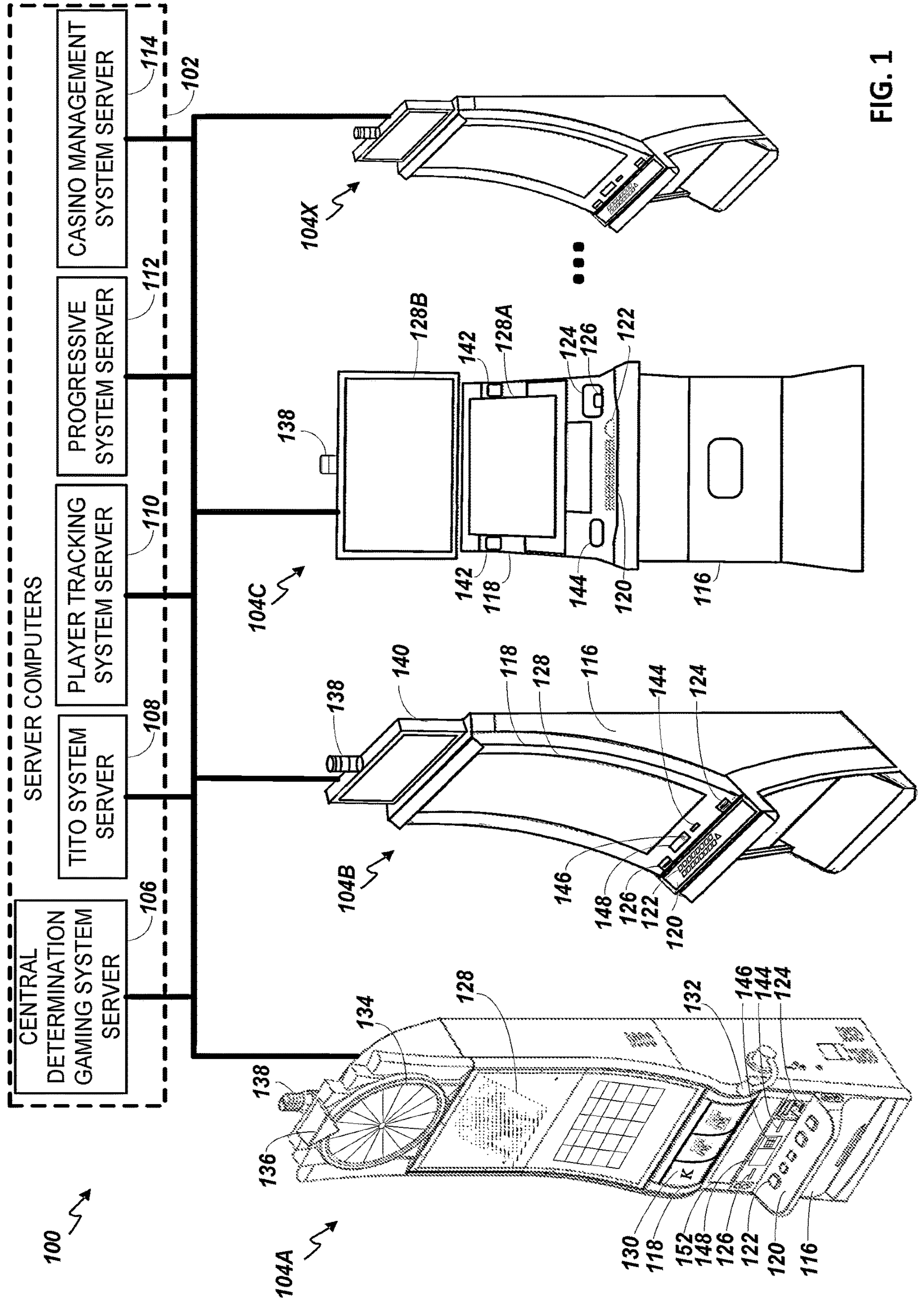
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
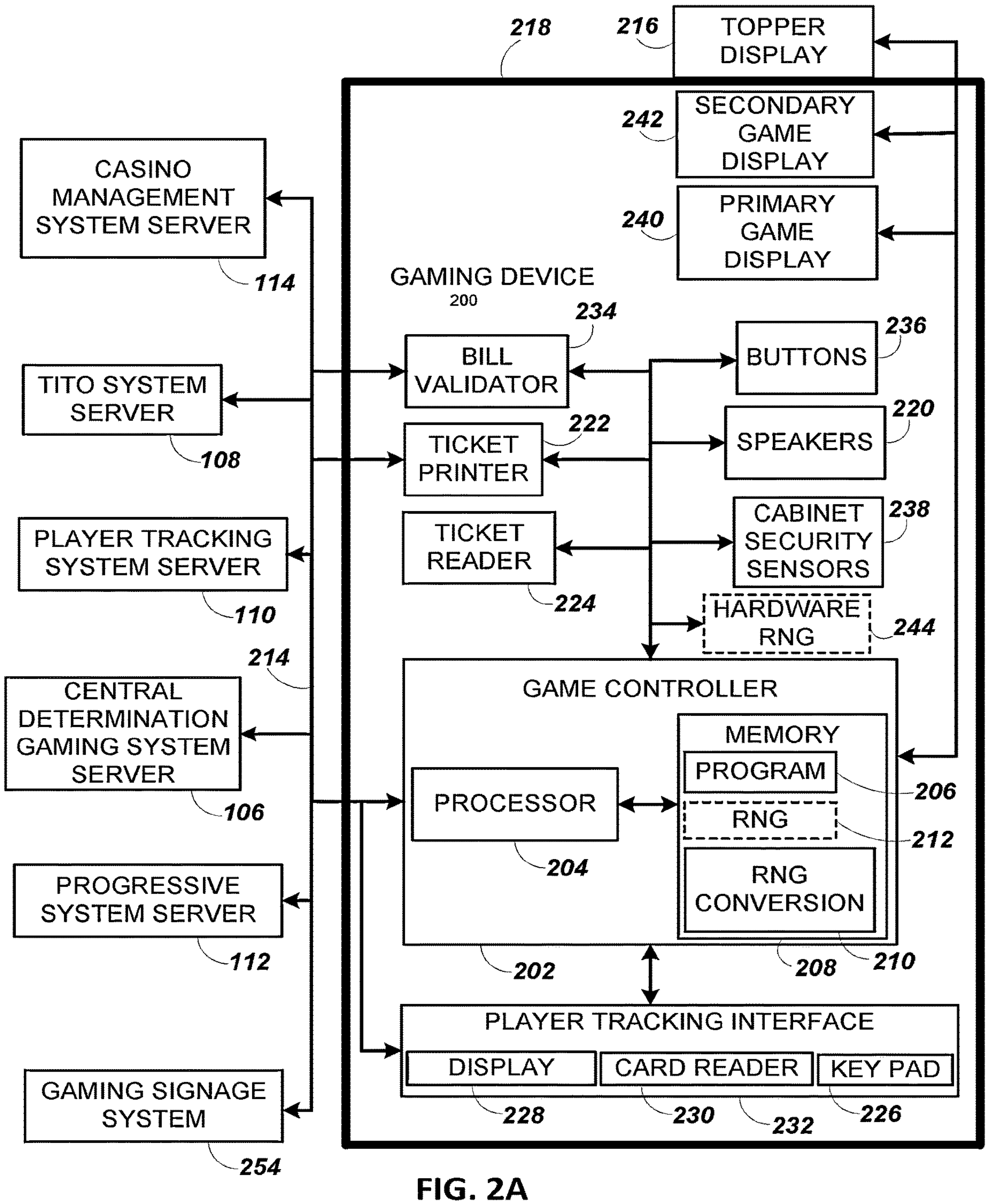
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
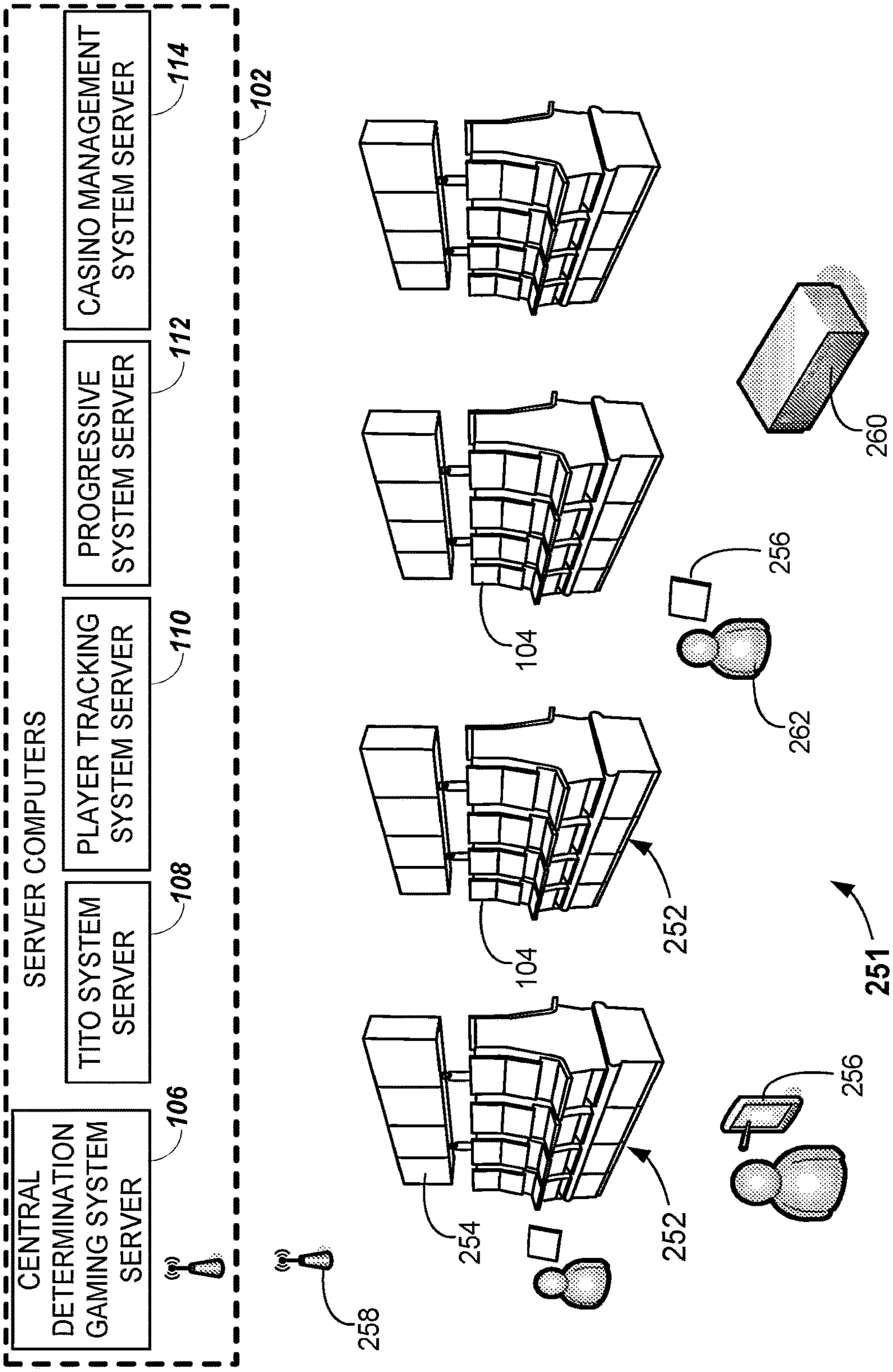
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
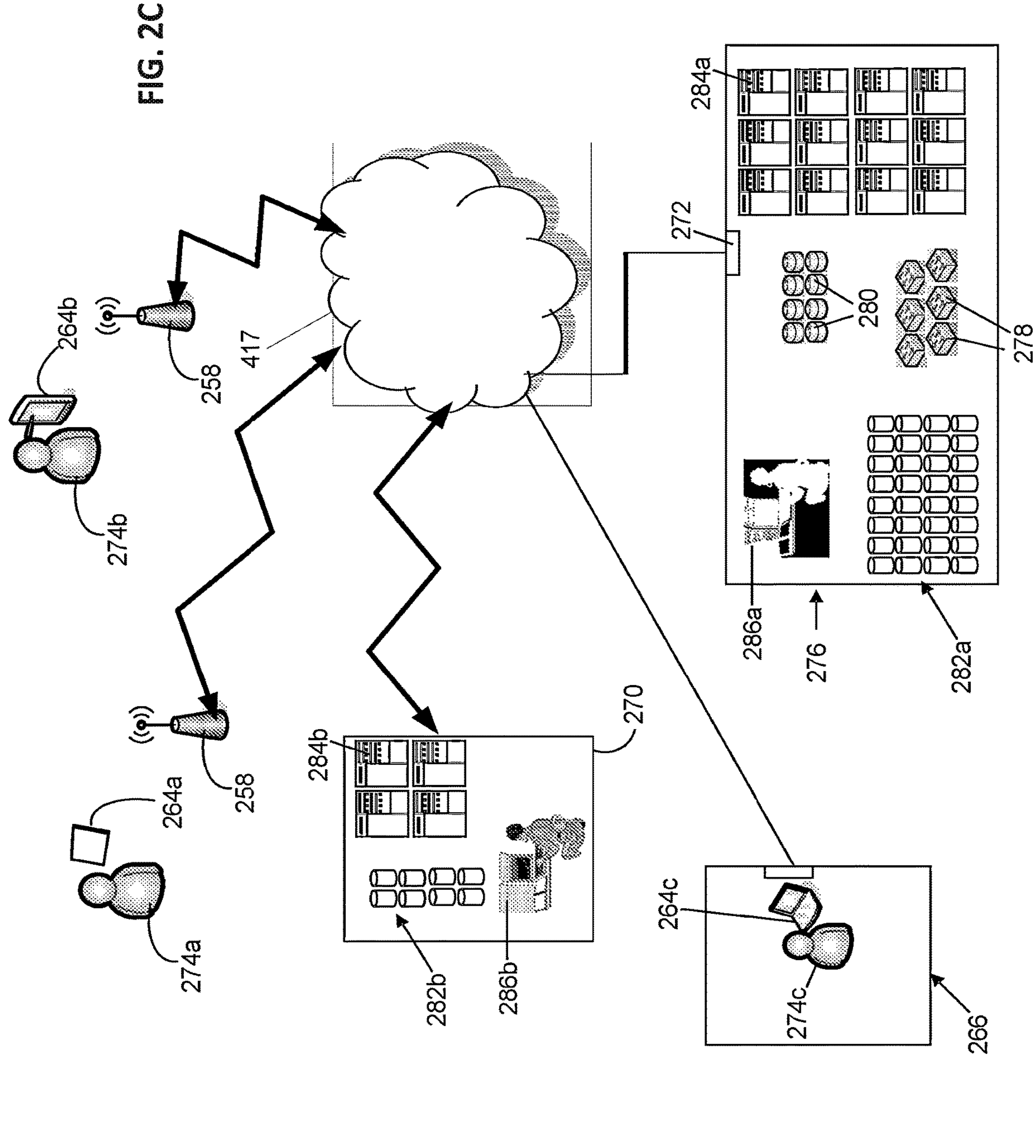
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
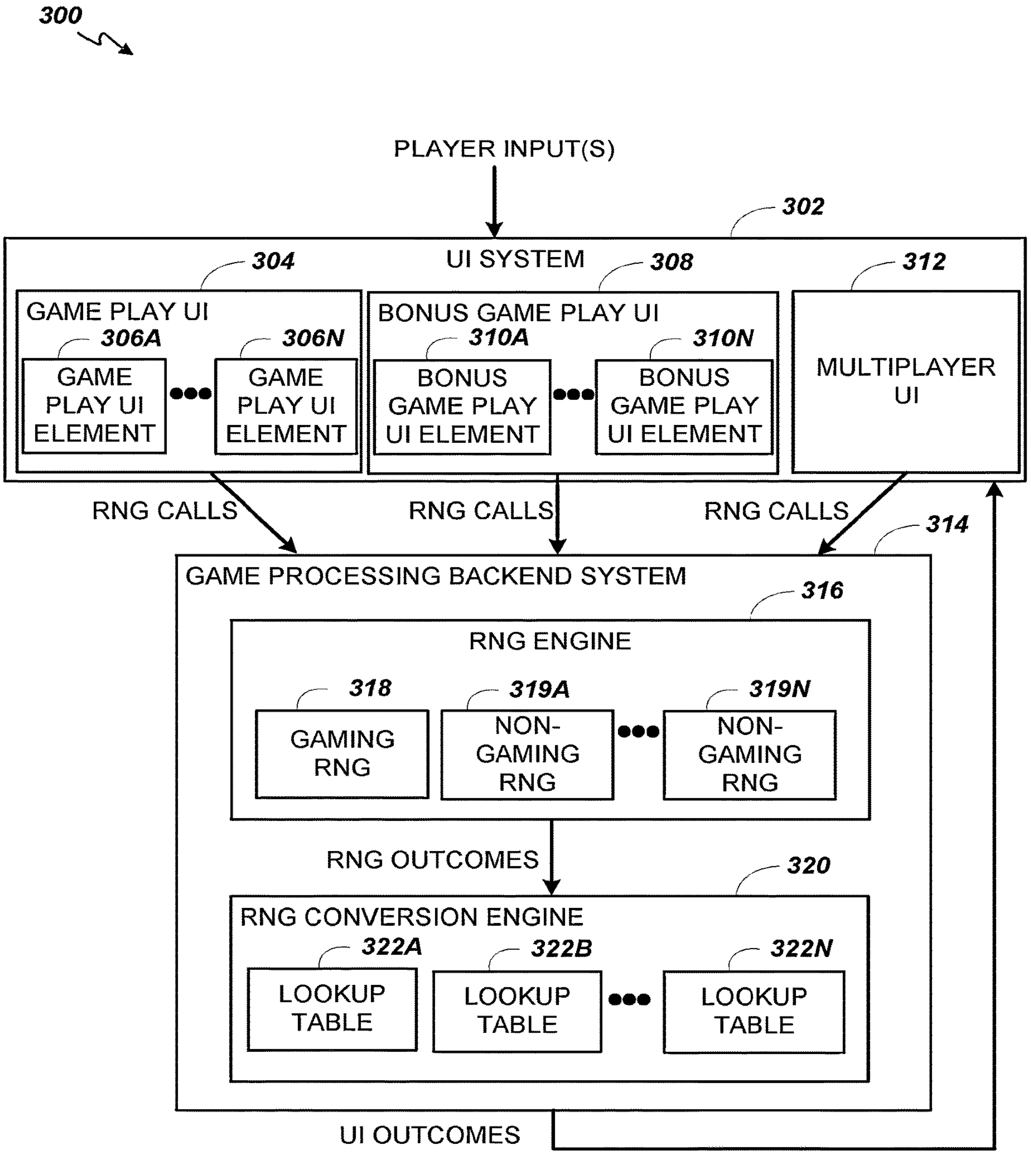
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

The present disclosure describes various implementations in which a main game, e.g., as may be provided by game processing architecture 300 of FIG. 3, is configured to include an array growth feature that allows an array of symbol positions used to display symbols as part of a graphical game play UI 304, e.g., such as by UI system 302 of FIG. 3, during game play of the main game to be increased in size in one dimension during game play responsive to satisfaction of an array growth condition. In such implementations, the main game is also configured to cause a feature game, such as may be presented via a bonus game UI 308, to be presented responsive to a feature game trigger condition being met—the feature game that is presented uses an array of symbol positions that has first and second dimensions that are the same as the first and second dimensions of the array of symbol positions in use in the main game at the time the feature game trigger condition was met. Such configurations are able to maintain player interest, and thus potential revenue streams resulting from game play, more effectively since a player that is playing the main game while the main game is displaying an increased-size array of symbol positions is will likely wish to continue playing knowing that a) their chances of triggering the feature game are likely increased due to the larger array size and b) that their chances of achieving a higher reward from the feature game, should it be triggered, will also be increased due to the increased array size. Moreover, such implementations may also allow for additional array growth during the feature game as well, thus building further on array growth that may occur during play of the main game.

The main games and feature games that are discussed below may both be described as being symbol-based games in which symbols are selected for display, e.g., randomly selected, such as via RNG engine 316 of FIG. 3, in an array of symbol positions presented to a player via a GUI as part of each play of the relevant game. Each symbol position is thus caused to display a corresponding symbol for each instance of game play. The arrays in question are typically rectangular arrays and may have a first dimension and a second dimension; the dimensions of an array refer to the number of elements the array has along two different, usually orthogonal, directions. For example, in a 3×5 slot machine game, the symbols that are displayed are shown in an array of symbol positions with five symbol positions in the horizontal direction and three symbol positions in the vertical direction. It will be understood that the techniques discussed below may be implemented in symbol-based games having arrays of symbol positions of any dimension, including 3×3, 3×4, 4×3, 4×5, 5×5, 4×6, 5×6, etc. In the presently described symbol-based games, the second dimension of the array may be modified during game play so as to add an additional set of symbol positions, equal in number to the first dimension of the array of symbol positions, to the array of symbol positions such that the size of the array in one direction increases, e.g., such that the second dimension of the array increases by one.

Many such symbol-based games may be considered to be reel strip games in which the symbols that are shown in parallel linear arrays of symbol positions within the larger array of symbol positions are selected so that the symbols that are depicted in each linear array are identical to, and in the same order as, a sequentially adjacent set of symbols within an ordered set of symbols associated with that linear array; sequentially adjacent, in this context, refers to items that are directly adjacent to each other in a sequence, i.e., with no other items in between them. For example, in mechanical slot machine games, the symbols that were displayed in the various symbol positions were provided by rotating a reel that had a collection of symbols positioned at various locations along its outer circumference. Only the symbols that were located on the portion of the reel that was visible to the player at any given time were shown to the player, and the symbols on the reel were always shown in the same sequence with each revolution of the reel. In most such mechanical slot machine games, the symbols were printed on a flexible reel strip that was wrapped around the outer circumference of the reel, thereby allowing the reel strips to be changed out if desired. The reel strips were generally strips of material having a length and width approximately equal to the circumference and width, respectively, of the reel; the symbols were then printed on this material, e.g., using silk screening or other suitable process, in the sequence in which they were to appear when the reel was spun. In digital slot machines, the physical reels are typically replaced with virtual representations thereof, and each reel strip correspondingly replaced with a "virtual" reel strip that includes information indicating an ordered sequence of symbols, e.g., information defining the sequential position of each symbol and what that symbol is, e.g., information identifying graphical content representing the symbol.

In virtual versions of reel strips, the symbols that represent a virtual reel strip may be associated with information that allows a sequence for such symbols to be determined. Such sequences may be cyclic, e.g., the first symbol in the sequence may be viewed as sequentially adjacent not only to the second symbol in the sequence, but also to the last. Similarly, the last symbol in the sequence may be viewed as sequentially adjacent to the first symbol in the sequence as well as to the penultimate symbol in the sequence.

It will be understood that reference herein to "selecting a symbol" is inclusive not only of directly selecting, for example, a specific image file of a symbol, but also of indirectly selecting graphical content to be displayed for a particular symbol. For example, "selecting a symbol" may include selecting an item from a sequential list of items in which each item includes information that allows graphical content for a particular symbol to be obtained and displayed but does not, itself, directly contain the graphical content. For example, a virtual reel strip may be an array that stores unique serial numbers, file names, or other identifiers that identify particular graphical assets that are each associated with a particular array position (thus defining a sequential order therefore) then retrieved and displayed to a user to show the relevant graphical content. In some implementations of digital symbol-based games that use virtual reel strips, symbols may be selected and displayed in each parallel linear array of symbol positions from such reel strips in contiguous blocks so as to simulate how a physical reel would provide symbols for display. In some other implementations, however, the symbol selected for display in each reel position may be made randomly. In most symbol-based games in which an array growth feature is implemented, the second dimension of the array of symbol positions may be along the axis perpendicular to the linear arrays discussed above. For example, if a 3×5 array of symbol positions supporting array growth includes 5 columns and 3 rows of symbol positions, with each column associated with a different reel strip, the second dimension would be the number of rows (3) and the first dimension would be the number of columns (5). It will be recognized that in most such implementations, the second dimension will correspond with the number of rows in the array, but it will also be apparent that the second dimension may, in some cases, instead correspond with the number of columns in the array. For example, for a slot-type symbol-based game that uses virtual reels that rotate about a vertical axis (instead of horizontal, as is usually the case for slot-type games), the second dimension may govern the number of columns of symbol positions that are used as opposed to the number of rows of symbol positions that are used.

Various specific implementations of games having symbol position arrays with a persistent growth feature are discussed below in more detail.

Figure 4:
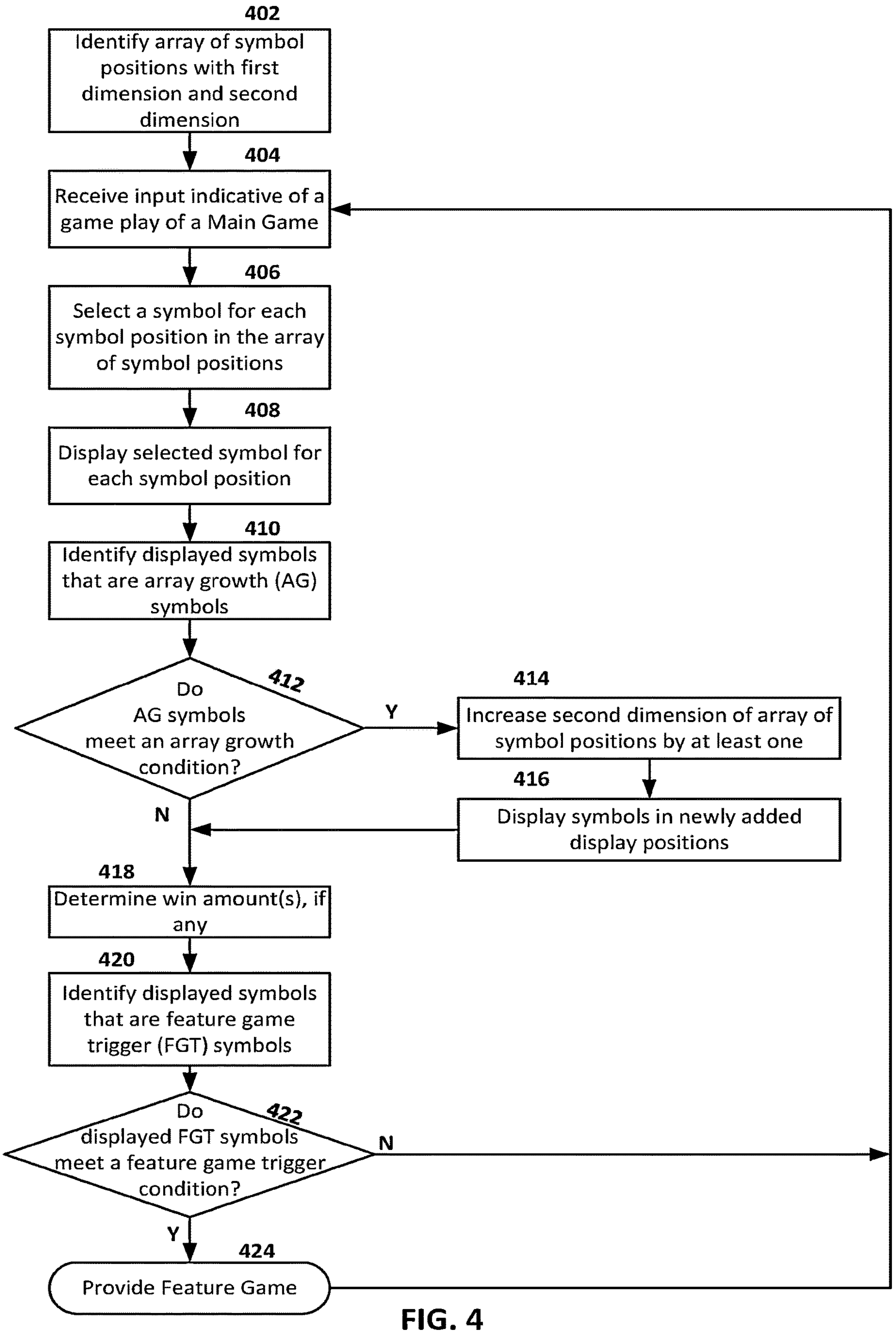
FIG. 4 depicts a flow chart of main game play for a main game featuring persistent array growth for an array of symbol positions.

FIG. 4 depicts a flow chart of main game play for a main game featuring persistent array growth for an array of symbol positions. In block 402, an array of symbol positions may be identified; each symbol position may be associated with location information that may govern where a symbol associated with that symbol position is to be displayed on a display or displays of an electronic gaming machine. The array of symbol positions may have a first dimension and a second dimension. When the main game is first played, e.g., after starting up the main game, the array of symbol positions may be set to a default value. The default value, in many implementations, will typically correspond to a minimum size of the array of symbol positions that may be allowed to occur within the main game during game play.

In block 404, an input may be received that indicates a game play of the main game. For example, such an input may correspond with an electrical signal that arises from a physical “play” or “spin” button being pressed by a user on an electronic gaming machine, or from a virtual analog of such buttons provided on a touch screen. Receipt of such an input by the electronic gaming machine may cause the electronic gaming machine to initiate a play of the main game. This may include, for example, selecting symbols in block 406 that are to be displayed in each symbol position of the array of symbol positions. It may also include initiating various animations or sound effects that are intended to symbolically or figuratively represent the symbol selection process, e.g., animations of spinning reels may be displayed, as well as sound effects associated therewith.

The symbol selection that occurs in block 406 may, in many implementations, be random. In some implementations, such random selection may be from a single, large set of symbols. In other implementations, there may be a set of symbols (which may include multiple instances of one or more of the symbols) associated with the main game that may be subdivided into multiple subsets of symbols, with each subset of symbols associated with a different set of symbol positions in the array that all have the same index value for the first dimension of the array. For example, each set of symbol positions for an example main game may correspond with a different column of symbol positions in which symbols selected from a corresponding virtual reel strip are displayed; the corresponding virtual reel strip for each set of symbol positions may represent the subset of symbols for that set of symbol positions. The set of symbols for a given game play in such an example would include all of the symbols included on all of the virtual reel strips from which symbols are selected for that game play.

It will also be understood that symbol selection for a given game play may also optionally involve selecting between different sets of symbols before selecting symbols for display in the symbol positions from the selected set of symbols. In such implementations, each set of symbols may, similar to the example discussed above, have corresponding subsets of symbols from which symbols may be selected for different sets of symbol positions. For example, a main game may have various special features that may be activated when a particular triggering symbol is displayed as a result of play of the main game. It may, however, be desirable to only potentially trigger one of these special features for any given play of the main game. For example, the main game may have a “free spin(s)” feature in which the player is allowed to engage in some predetermined number of free game plays, e.g., without needing to place a wager using their own funds, an “array growth” feature (as discussed above and also below in more detail), and a “feature game” feature, e.g., a bonus game that may be presented to the player and which may have game play that differs from the main game in some way. It may be desirable to avoid scenarios in which a player might trigger two of more of these features simultaneously, e.g., doing so may confuse the player, or the player may assume that the features will be activated in a particular order that is different from the order used by the electronic gaming machine (for example, if both the free spin(s) feature and the array growth feature are triggered, are the free spins provided after the array growth occurs or before?). To avoid such scenarios, it may be desirable to have three sets of symbols—one with one or more free spin symbols but no feature game trigger symbols or array growth symbols, one with one or more array growth symbols but not feature game trigger symbols or free spin symbols, and one with one or more feature game trigger symbols but no array growth symbols or free spin symbols. In such an implementation, a selection may be made between two or more of such sets of symbols before symbols for display are actually selected from the selected set of symbols.

Each set may, of course, include other symbols as well, e.g., symbols that are used to evaluate whether one or more winning patterns of symbols are displayed along one or more paylines associated with the main game and which may not be associated with a feature such as the above-discussed features. Paylines typically include a sequence of symbols, with each symbol in the sequence taken from the symbols being displayed for a different set of symbol positions, where each set of symbol positions includes symbol positions that share an array index in common with each other. For example, in many slot-type main games in which each vertical column of symbol positions displays symbols selected from a virtual reel, each payline may include one symbol from each column of symbols displayed. If the symbols associated with a particular payline form a pattern that matches a pattern that is specified as being associated with a winning outcome, the player that obtained such a pattern may be awarded an award of credits (either credits redeemable for currency or non-redeemable credits, e.g., social gaming currency) or other prize.

In some symbol-based games, such paylines may be limited in number, e.g., in a 3×5 symbol-based game, there may be three paylines that cover, collectively, the top, bottom, and middle rows of 5 symbols displayed. Other such symbol-based games may include additional paylines, e.g., diagonal paylines, W-shaped or M-shaped paylines, etc. Some symbol-based games, however, may allow for winning patterns along all paylines that exist under certain constraints. These games may be referred to as “ways” games, and may evaluate symbol patterns along all paylines that can be established within the array of symbol positions subject to certain constraints. For example, a typical ways game will evaluate symbol patterns that arise on all paylines that include one symbol from each set of symbol positions, with each set of symbol positions representing a different column of symbol positions within the array and with the symbols arranged in order of left-to-right appearance within the array. Thus, for example, a ways game with a 3×5 array of symbol positions (3 rows, 5 columns) would have $3^5=243$ paylines along which winning patterns may be determined. A ways game with a 4×5 array of symbol positions would similarly have 1024 paylines, a 5×5 array of symbol positions would have 3125 paylines, and a 6×5 array of symbol positions would have 7776 paylines.

In block 408, the symbols selected for display in each of the symbol positions may be caused to be displayed on the display in locations associated with the corresponding symbol positions. It will be understood that such display is inclusive of examples in which one or more symbols that were displayed in a location or locations on the display or displays associated with one or more corresponding symbol positions do not change, e.g., there may be some main games in which a certain type of displayed symbol may, once displayed, be caused to remain in place for one or more subsequent game plays (often referred to as a "sticky" symbol). In such a case, the "sticky" symbol may simply be retained for display in that symbol position for as long as the symbol remains "sticky"—this, in itself, may be viewed as a form of symbol selection (thus, the later displays/continued display of sticky symbols may be considered to be a non-random selection of that symbol for display—although the sticky symbol may have been randomly selected for display initially).

In block 410, symbols displayed in the array of symbol positions that are array growth symbols may be identified; in some instances, such identification may simply amount to determining how many of such array growth symbols are displayed within the array of symbol positions. Such identification may also be performed prior to display of the symbols but after selection of the symbols.

In block 412, a determination is made as to whether the displayed array growth symbol(s), if any, meet an array growth condition. The array growth condition may, for example, be any one or more conditions that, if satisfied, may cause block 414 to be performed so as to cause the electronic gaming machine to increase the size of the array of symbol positions by increasing the second dimension of the array by one or more units. For example, satisfaction of an array growth condition may cause the electronic gaming machine to cause the array of symbol positions to expand by one row if the second dimension indicates the number of rows in the array. Other implementations may involve causing the second dimension of the array of symbol positions to increase by more than one unit in size, e.g., two units or three units, responsive to the array growth condition being met. In block 416, symbols may be selected and displayed for any symbol positions newly added to the array of symbol positions in block 414. Such newly added symbols may be selected responsive to a determination that the second dimension of the array of symbol positions should be increased or may, alternatively, have been selected as part of the original selection of symbols in block 406 but not included in the symbols that were displayed in block 408. For example, if the electronic gaming machine is configured to present a 3×5 array of symbol positions that can be grown to a maximum of a 6×5 array through the above-described array growth mechanism, block 406 may not only include selecting symbols for the symbol positions in the array of symbol positions based on its dimensions at the time of the game play, but may also include selecting symbols for symbol positions that are not part of the array of symbol positions at the time of game play but could be if an array growth condition were to be met in that game play.

Various array growth conditions may be used, although perhaps the simplest and most common is an array growth condition that is satisfied when at least one displayed, or to-be-displayed, symbol is an array growth symbol. A somewhat more restrictive array growth condition may require that a plurality of displayed or to-be-displayed symbols for a given game play be array growth symbols. It will be understood that "displayed" symbols are inclusive of both symbols that are actually displayed for the game play in question or that have been selected for display for that given game play but have not yet actually been displayed in association with that game play. Other examples of array growth conditions may include, for example, conditions that are met when an array growth symbol is displayed in a particular location in the array of symbol positions, e.g., in a symbol position along a top edge of the array, or conditions that are met when a specified set of array growth symbols are displayed. For example, there may be several types of array growth symbols that are able to be selected, e.g., one that shows a small flower, one that shows a watering can, and one that shows the sun—the array growth condition may require that at least one array growth symbol of each of the three such types of array growth symbols be displayed for a given game play in order to be satisfied (in this case, the three symbols are selected so as to represent items needed to grow a flower, much as the array is grown, but such thematic linkage is not necessary). Some array growth conditions may be variable, e.g., the number of array growth symbols that must be displayed as the result of a play of the game in order to satisfy the array growth condition may increase based on the size of the array. For example, at least one array growth symbol may need to be displayed to cause the second dimension of the array to increase by one unit from its base value, but at least two array growth symbols may need to be displayed to then cause the second dimension of the array to grow by a further one unit (e.g., the base value plus two), and at least three array growth symbols may need to be displayed to cause the second dimension of the array to grow by a further one unit beyond that (e.g., the base value plus three). Array growth conditions may also optionally include requirements that may be independent of the number of array growth symbols that are shown. For example, an array growth condition may require, in addition to a predetermined number of array growth symbols being shown, that the second dimension of the array be less than the maximum permitted value for the array.

In some implementations, if the array growth symbols that are displayed for a given game play are sufficient to satisfy the array growth condition multiple times, then the electronic gaming machine may cause the second array dimension to correspondingly increase multiple times. For example, if the array growth condition is that an array growth symbol must be displayed and a game play results in two array growth symbols being displayed, the array growth feature may be triggered twice for that game play, resulting in twice as much array growth as would be the case if a single such array growth symbol were to be displayed for that game play. In other implementations, however, only one array growth operation may be performed for any given game play responsive to the array growth condition being met as a result of that game play, even if the array growth condition is met multiple times.

It will be understood that in most implementations, the electronic gaming machine may be configured to only permit a limited degree of dimensional growth in the array of symbol positions. For example, the electronic gaming machine may only allow a maximum of 2, 3, 4, 5, 6, or 7 units in total to be added to the second dimension. Such limitation may be accomplished in any feasible manner, including, but not limited to, ceasing use of a set of symbols that includes the array growth symbols, ignoring any array growth symbols that might be selected (not displaying them), etc.

After completion of block 416, the technique may proceed to block 418, which is the same block that the technique may proceed to if it is determined in block 412 that the array growth symbols displayed for that game play, if any, do not meet the array growth condition.

In block 418, a determination may be made as to any win amounts, e.g., based on symbol patterns along paylines, as discussed above, that may have resulted from the game play. If the game play has resulted, for example, in any winning combination of symbols to be displayed along any of the paylines for the symbol-based game, the electronic gaming machine may cause a credit balance, score, or other metric to be incremented by the amount of the win. A notification may be provided to the player to indicate the amount of the win.

In block 420, any displayed symbols that are feature game trigger symbols may be identified. The feature game trigger symbols may be all of the same type or may be multiple different types. For example, in some implementations, the feature game trigger symbols may be cash-on-reel symbols that may display different numeric amounts of credit or point values and/or different levels of jackpot awards, e.g., major, mini, minor. These may all be treated as "feature game trigger symbols" despite having different appearances and potentially being treated differently in contexts other than in feature game triggering (for example, the feature game trigger symbols may also be used to determine award amounts in some contexts, and the different types of feature game trigger symbols may have different effects on the award amount that is determined). In block 422, a determination may be made as to whether the feature game trigger symbols identified in block 420 meet a feature game trigger condition. If not, the technique may return to block 404, where a further input may be received indicative of another game play (assuming the player elects to continue playing). In the event that a determination is made that the feature game trigger condition is met, the technique may proceed to block 424, in which a feature game may be provided for play. The technique may then proceed to return to block 404 after the feature game concludes.

As with the array growth condition, the feature game trigger condition may, depending on the implementation, take any of several forms. For example, the feature game trigger condition may be met when a predetermined number of feature game trigger symbols are displayed in the array of symbol positions. In some implementations, the minimum number of the feature game trigger symbols that must be displayed to meet the feature game trigger condition may be equal to the maximum value that the second array dimension is allowed to reach as a result of the array growth feature being triggered. For example, an electronic gaming machine may be configured to allow a 3×5 array of symbol positions may be "grown" to be as large as a 6×5 array of symbol positions but may prevent further growth beyond that level. In some such implementations, the electronic gaming machine may be further configured to have a feature game trigger condition that is met when six feature game trigger symbols are displayed in the array of symbol positions.

By increasing the size of the symbol position array, electronic gaming machines providing such main games may present players with an increased chance of earning an opportunity to play a feature game since the additional symbol positions that are added when the array size is grown responsive to the array growth trigger condition being met provide additional opportunities for a) additional array growth symbols to be shown and b) additional feature game trigger symbols to be shown, both of which may contribute to meeting respective array growth conditions and feature game trigger conditions.

Figure 5:
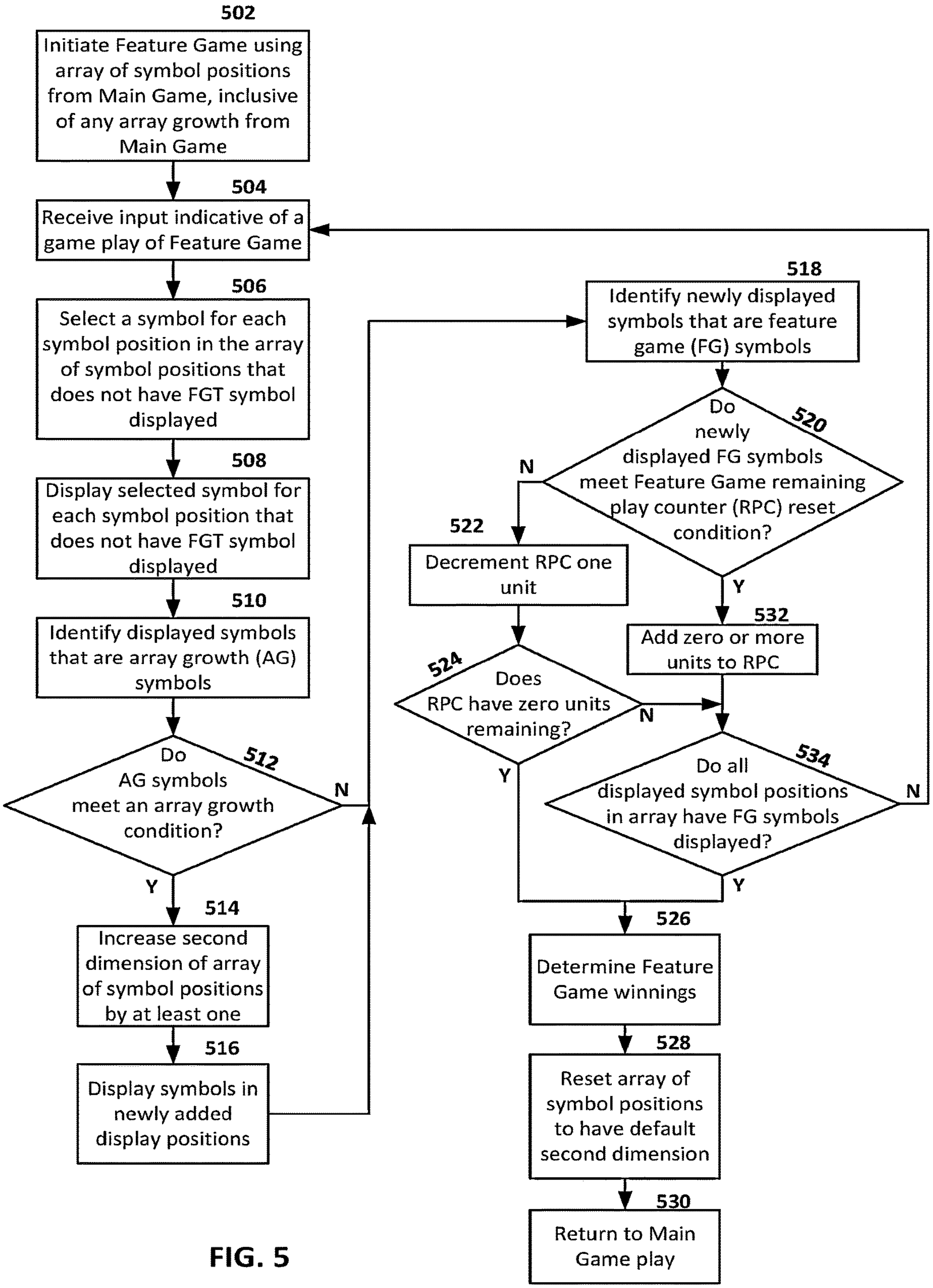
FIG. 5 depicts a flow chart of feature game play for a feature game that uses an array of symbol positions inherited from a main game having persistent array growth for an array of symbol positions.

FIG. 5 depicts a flow chart of feature game play for a feature game that uses an array of symbol positions inherited from a main game having persistent array growth for an array of symbol positions. In some implementations, the feature game trigger symbols may be replaced by different feature game symbols, whereas in other implementations, the same symbols may be used as both the feature game trigger symbols and the feature game symbols, e.g., such symbols may have a dual purpose/use.

If a feature game is trigged as a result of the determination in block 422, the presentation of the feature game may begin in block 502, in which the feature game may be initialized using an array of symbol positions from the main game that is inclusive of any array growth that may have occurred in the main game. In some implementations, the symbols displayed in each symbol position of the array of symbol positions in the feature game may be the same symbols shown in the array of symbol positions in the main game at the time the feature game is triggered. In such implementations, the feature game may, in some instances, use the same array of symbol positions and displayed symbols that were most recently provided in the main game when initiating the feature game.

In block 504, an input may be received that is indicative of a game play of the feature game. Such an input may, similar to the input received in block 404, be an input signal that is indicative of a player interaction with the electronic gaming machine that indicates that the player wishes to engage in a play of the feature game.

In block 506, symbols may be selected for each symbol position that does not already have a feature game symbol displayed (symbols may also be selected for the symbol positions that have the feature game symbol displayed, but those symbols may be ignored/not displayed in those symbol positions). Such symbol selection may occur randomly, similar to the selection methods discussed above with respect to block 406.

In block 508, the selected symbols from block 506 may be caused to be displayed in the corresponding symbol positions in the array of symbol positions that do not already have feature game symbols displayed.

In block 510, symbols displayed in the array of symbol positions that are array growth symbols may be identified; as in block 410, such identification may simply amount to, in some instances, determining how many of such array growth symbols are displayed within the array of symbol positions. Such identification may also be performed prior to display of the symbols but after selection of the symbols.

In block 512, a determination may be made, similar to that in block 412, as to whether the displayed array growth symbol(s), if any, meet the array growth condition. The array growth condition may, as discussed earlier, be any one or more conditions that, if satisfied, may cause block 514 to be performed so as to cause the electronic gaming machine to increase the size of the array of symbol positions by increasing the second dimension of the array by one or more units. In block 516, symbols may be selected and displayed for any symbol positions newly added to the array of symbol positions in block 514, similar to the operations performed in block 416.

Following block 516, or block 512 should it be determined in block 512 that the array growth condition is not met as a result of the current game play of the feature game, the technique may proceed to block 518, in which any newly displayed symbols that are also feature game symbols may be identified. In block 520, a determination may be made as to whether any of the newly displayed feature game symbols meet a remaining play counter reset condition. For example, in feature games that are often referred to as "hold and spin" games, players are typically provided with a set number of spins or plays of the feature game. The remaining play counter may be decremented by one for each spin or play of the feature game until the player runs out of plays, at which point the feature game may be concluded and game play may return to the main game. When a feature game symbol is caused to be displayed in a symbol position such that it replaces a symbol other than a feature game symbol, the newly displayed feature game symbols may be evaluated in block 520 to see if they meet the requirements of a remaining play counter reset condition. If the remaining play counter reset condition is not met, then the technique may proceed to block 522, in which the remaining play counter may be decremented by one unit to reflect that a play of the feature game has occurred. The technique may then proceed to block 524 in which a determination is made if the remaining spin counter has zero units remaining. If it is determined in block 520 that the remaining play counter reset condition is met, then the technique may instead proceed to block 526, in which zero or more units may be added to the remaining play counter. In some implementations, the amount that may be added to the remaining play counter may be equal to the difference between the current value of the remaining play counter and the initial value of the remaining play counter at the start of the feature game, i.e., the remaining play counter may be reset to its initial value.

The remaining play counter reset condition may be any one of a variety of conditions, depending on the implementation. For example, in some implementations, any feature game symbol that is newly displayed as a result of a feature game play may satisfy the remaining play counter reset condition. In some such implementations, the reset that occurs to the remaining play counter may be a complete reset, i.e., it may be restored to its initial value.

In other implementations, the reset that occurs to the remaining play counter when the remaining play counter reset condition is met may be a partial reset, e.g., adding 1 unit to the remaining play counter. In yet other implementations, the reset that occurs may simply be a non-change reset, i.e., the remaining play counter may simply be left alone with no increment or decrement thereto.

It will be understood that the above discussion relating to the operation of the remaining play counter is intended to also apply to the mathematical complement of remaining play counter, i.e., a plays completed counter that reflects the number of feature game plays that have occurred and are eligible to be compared against a maximum threshold number of plays that the player is provided as part of the feature game. For example, if the player is permitted three plays, the plays completed counter may start at zero and increment upward by one unit instead of downward with each play of the feature game—when the counter reaches the permitted maximum number of plays, the feature game will be concluded. Similarly, if a feature game play results in the analog to the remaining play counter reset condition (a "completed plays counter reset condition," for example) being met, then the completed plays counter may be decremented by 0 or more units instead of incremented. As noted above, it is the intent of this disclosure that both types of counter be considered within the scope of the above discussion regarding the remaining play counter.

If it is determined in block 524 that the remaining play counter has zero units remaining, or if block 526 has been performed responsive to determining in block 520 that the remaining play counter reset condition has been met, the technique may proceed to block 528, in which a further determination may be made as to whether all displayed symbol positions, i.e., all symbol positions having symbols displayed therein, display feature game symbols. In the event that not all of the symbol positions display feature game symbols, the technique may return to block 504, and a further input indicative of a play of the feature game may be received.

If it is determined in block 528 that all of the displayed symbols are feature game symbols, or if it is determined in block 524 that the remaining play counter has zero units remaining, the feature game may terminate, proceeding to block 530, in which a determination may be made as to what the winnings are associated with the feature game symbols that are displayed in the array of symbol positions as of the termination of the feature game. The array of symbol positions may then be reset in block 532, e.g., to an array with first and second dimensions that are set to be equal to the initial values of those dimensions in the main game prior to any growth of the second dimension. The technique may then proceed to block 534, in which the feature game concludes and the electronic gaming machine returns to presenting the main game for play. Any credits or points that result from play of the feature game may be transferred to the player's credit or point pool for the main game.

As will be apparent from the above discussion, the feature game has the potential to be playable by the player until either of two potential conditions are met—either the player runs out of available plays to use in playing the feature game, or the player manages to completely fill in the array of symbol positions with feature game symbols. It will be understood that the latter condition may be fulfilled for an array of symbol positions even if the array of symbol positions could potentially be grown to a larger size—if the array of symbol positions is, at its current growth state, filled with displayed feature game symbols, then this may be deemed to terminate the feature game.

It will be further understood that each feature game symbol that is newly displayed in a symbol position in the array of symbol positions during the feature game as a result of a play of the feature game may remain "stuck" in place, i.e., not replaced with another symbol, for the duration of the feature game.

The awards or prizes that are associated with the player in conjunction with the termination of the feature game may be determined according to various rules. For example, the player may be awarded an amount of credits or points for each feature game symbol that is displayed at the conclusion of the feature game. Alternatively, the player may be awarded different tiers of points or credits based on the number of feature game symbols displayed at the conclusion of the feature game. In some implementation, players may be awarded a jackpot award, e.g., significantly larger than non-jackpot awards that may be earned in the feature game, when all of the symbol positions in the array of symbol positions at the conclusion of the feature game display feature game symbols (a "blackout" condition). In some such implementations, the size of the jackpot awarded for achieving a blackout condition may vary based on the amount of growth in the array of symbol positions, e.g., achieving a blackout condition on a 6×5 array of symbol positions may result in an award of points or credits that is higher than the award of points or credits that occurs when a blackout condition is achieved on a 5×4 array of symbol positions.

FIGS. 6 through 17 are provided for further insight as to the user experience that a player may encounter when playing a game such as that described above. It will be recognized that the depicted examples are merely representative of some particular outcomes that may be encountered by a player, and that the outcomes that are encountered during play of a main game and/or feature such as are described herein will, of course, differ from game play to game play.

Figure 6:
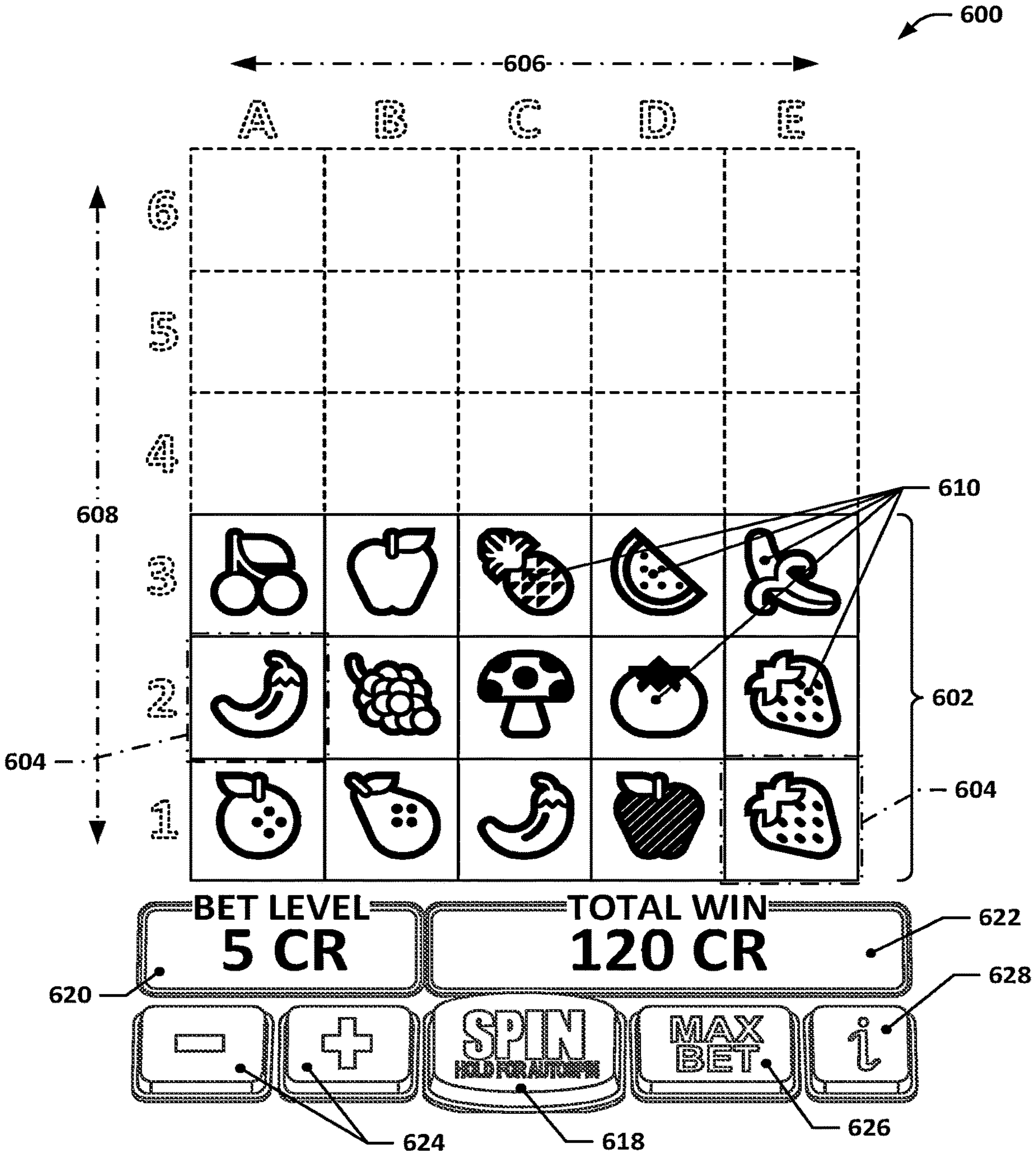
FIG. 6 depicts an example GUI for a main game including a persistent array growth mechanism for an array of symbol positions.

FIG. 6 depicts an example GUI for a main game including a persistent array growth mechanism for an array of symbol positions. FIG. 6 depicts a graphical user interface (GUI) 600 that may be displayed by an electronic gaming machine. The GUI 600 of FIG. 6 is configured to present a main game for play by a player. The main game is a symbol-based game in which an array 602 of symbol positions 604 (only two are called out, but 15 symbol positions are present) is provided. The array 602 may have a first dimension along direction 606 and a second dimension along direction 608; the second dimension may be variable, i.e., able to be changed during game play in response to an array growth condition being met (the dimensions 606 and 608 are provided for reference; they would generally not be depicted as part of the GUI 602). It will be recognized that in some implementations, the first dimension may instead be along direction 608 and the second dimension along direction 606. In this example, the array 602 may have a second dimension that may be able to be grown to a maximum value of six, although other maximum values may be used instead depending on various factors, e.g., display size, desired game performance/return-to-player, etc.

To facilitate discussion, various portions of FIGS. 6 through 17 are shown in broken lines; these are provided for the readers reference and do not necessarily form part of the GUI 600. For example, each row (or potential row should the array 602 be grown to its maximum size) in the array 602 is provided with a numeric callout to the left of the array 602, and each column in the array 602 is provided with an alphabetic callout above the array 602. In a further example, broken lines are used to indicate symbol positions 604 that may be part of the array 602 when the array 602 has been grown to its maximum state. In some implementations, the GUI 602 may actually show similar graphics to indicate to the player the extent of further growth that may occur in the array 602, although in other implementations, such graphical indicators may be omitted.

It will be understood that reference herein to an array of symbol positions is intended to refer to the array of symbol positions that will be used to show symbols 610 that are visible to the player and that are actively used to determine game results for a current play of the game. For example, in some implementations, an electronic gaming machine may, for each game play, actually select symbols 610 for all potential symbol positions that may exist when the array is in its maximum growth state—even if the array is currently in a less-than-maximum growth state (as shown in FIG. 6). For example, in the context of FIG. 6, symbols 610 may be selected for both symbol positions 604 in rows 1 through 3, but also rows 4 through 6—however, only the symbols 610 that are associated with symbol positions 604 in rows 1 through 3 would actually be displayed and the array 602 of symbol positions 604 would thus be considered to only constitute the symbol positions 604 in rows 1 through 3 (the symbols 610 that are associated with symbol positions in rows 4 through 6 would either not be displayed at all or would be displayed but obscured by some other graphic, e.g., a padlock to indicate that they may be "unlocked" if the array 602 is grown). In some implementations, symbols 610 may actually be selected and displayed in all actual and potential symbol positions 604 of the array 602, but the array 602 may be considered to only consist of the symbol positions 604 for which a symbol 610 is both displayed and used to determine an outcome for the current game play. For example, in some implementations, when symbols are shown in symbol positions 604 that are not part of the array 602 (because the array 602 has not been grown sufficiently to include them), those symbols 610 may be shown in a visually different format to emphasize that they are not actively being used in determining game outcomes—the player, however, would still see them (and see how such symbols would have increased their winnings had they been included in determining game outcomes for the current play) and may be incentivized to continue playing in the hopes that they will be able to grow the array 602 so as to actually be able to have the symbols 610 that are shown in symbol positions 604 that are currently outside of the array 602 be included for determining game outcomes in the future.

Also shown in FIG. 6 are various on-screen controls; these may optionally be omitted and provided via physical buttons on an electronic gaming machine. Such controls may include, for example, bet or wager increment/decrement buttons 624, a spin or play button 618, a max bet button 626, and an information button 628. The bet or wager increment/decrement buttons 624 may be used to provide inputs to the electronic gaming machine that allow the amount that is wagered on each play of the main game to be adjusted upward or downward, as appropriate. The bet max button 626 may be used to set the wager or bet level to the maximum value that the electronic gaming machine is configured to permit. The information button 628 may be used to launch a secondary GUI that may provide instructions on how to play the game, what the potential winning awards are, etc. The play or spin button 618 may be used to initiate a play of the main game, e.g., to initiate a "spin" or selection of symbols 610 for the symbol positions 604 in the array 602.

Information regarding game status may also be provided via informational displays or controls, such as the bet level indicator 620 and the total win indicator 622. The bet level indicator 620 may indicate the total amount, e.g., in credits or points, that will be wagered on an outcome of the main game responsive to a play of the game, e.g., initiated via selecting the play button 618. The total win indicator 622 may indicate the amount of credits that are available to the player in the game; the indicated amount may be increased responsive to the player adding credits, e.g., from an external source, or responsive to credits that are awarded due to play of the main game and/or feature game (which is discussed later).

As can be seen in FIG. 6, a random assortment of symbols 610 has been displayed in the symbol positions 604 of the array 602; such symbols may be evaluated to determine if any winning symbol combinations have been displayed along any of the paylines that the electronic gaming machine is configured to evaluate.

Figure 7:
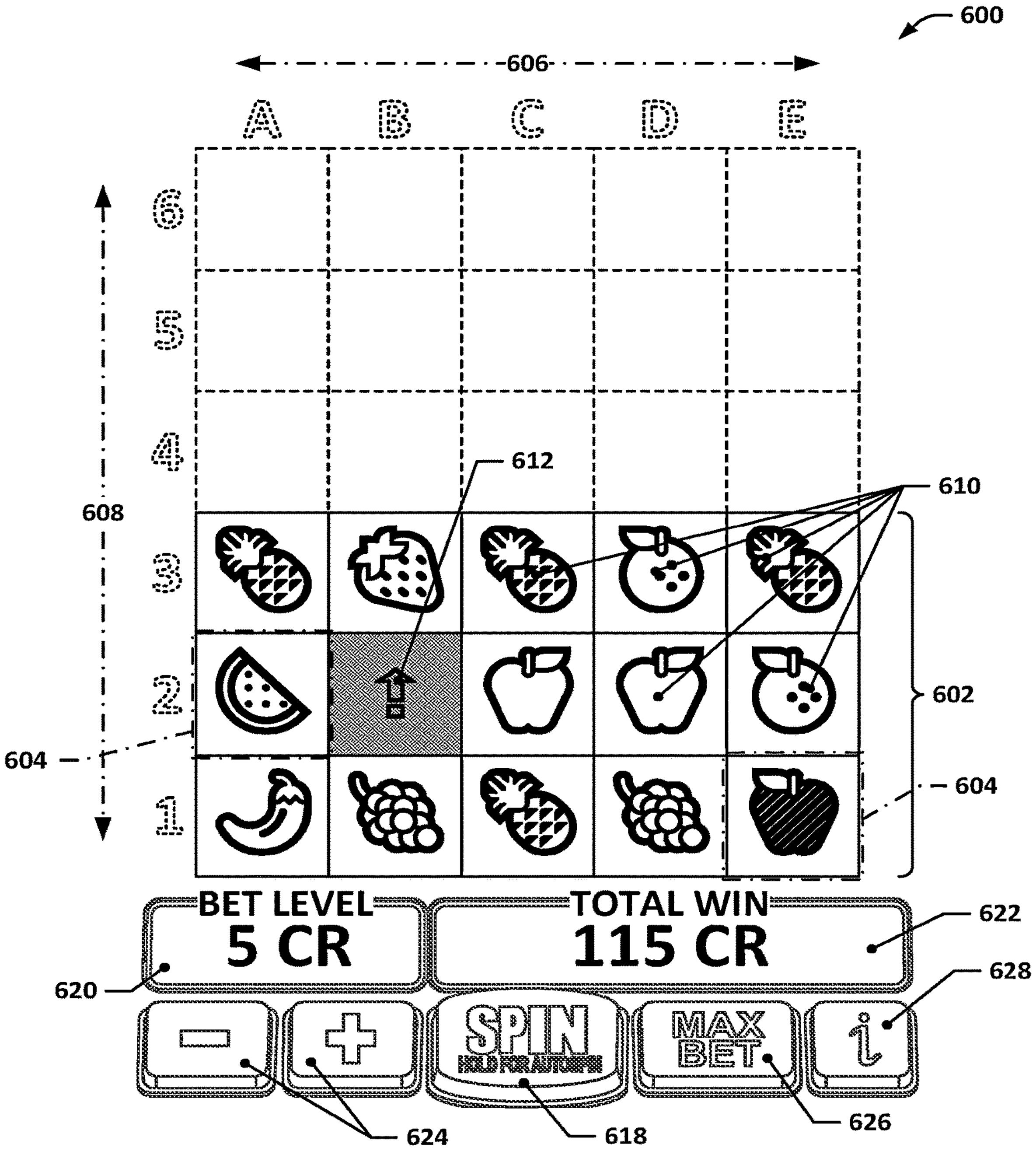
FIG. 7 depicts the example GUI of FIG. 6 in an example game state for the main game in which an array growth symbol is displayed in one of the symbol positions.

FIG. 7 depicts the example GUI of FIG. 6 in an example game state for the main game in which an array growth symbol is displayed in one of the symbol positions. In FIG. 7, it can be seen that the symbols 610 of FIG. 6 have been replaced, e.g., responsive to a play of the main game initiated by an input received via the play button 618, with new symbols 610, including an array growth symbol 612 (to be clear, the array growth symbol 612 is also a symbol 610). The array growth symbol 612, in this case, is an arrow pointing upwards, but any desired symbol or types of symbols may be used for the array growth symbol. In this example, the array growth condition is satisfied when one or more array growth symbols 612 are displayed in the array 602 of symbol positions 604. Thus, the electronic gaming machine may, in connection with the display of the array growth symbol 612, cause the second dimension of the array 602 to increase by one unit.

Figure 8:
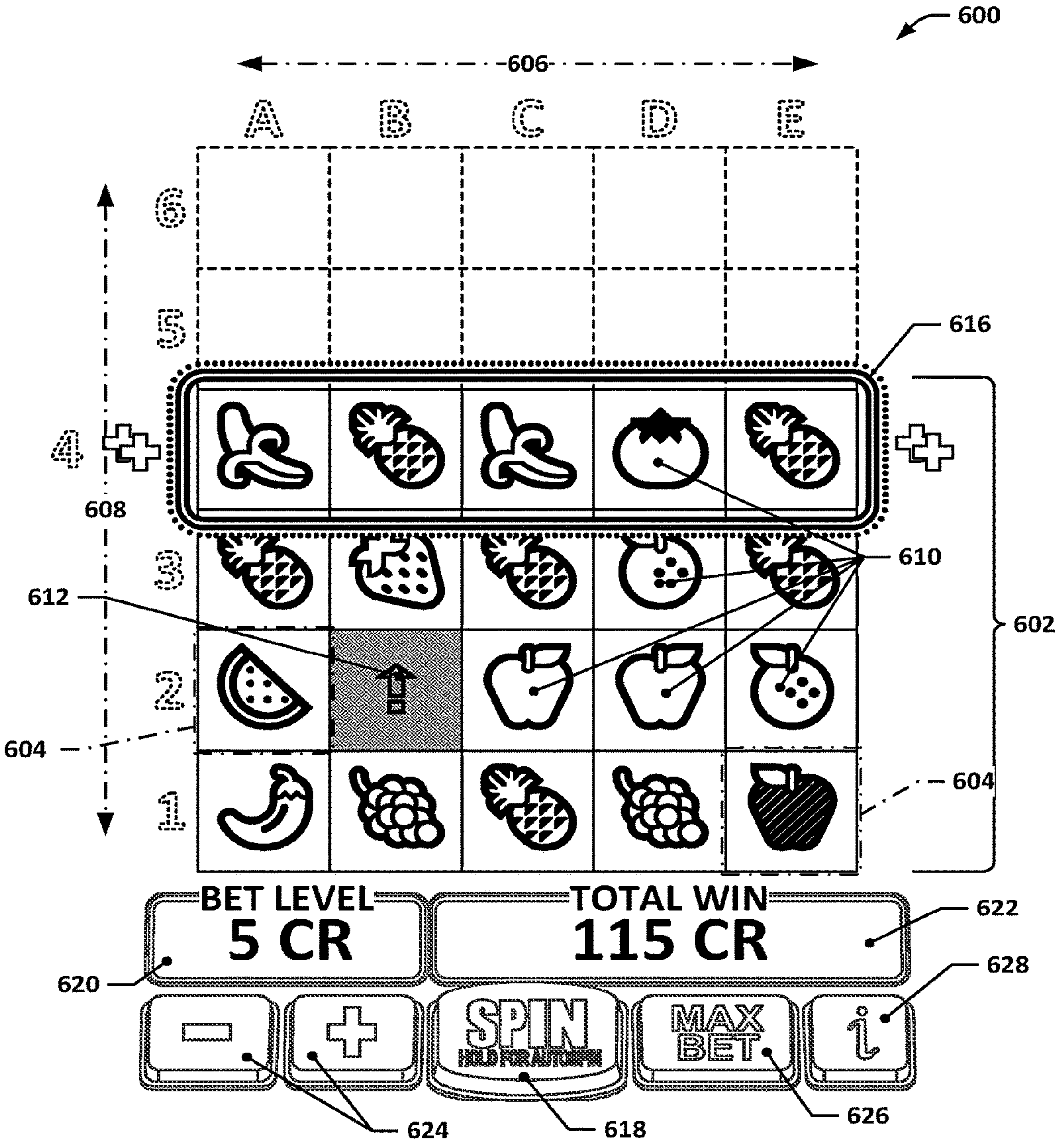
FIG. 8 depicts the example GUI of FIG. 6 after a second dimension of the array of symbol positions has been increased by one unit.

FIG. 8 depicts the example GUI of FIG. 6 after the second dimension of the array 602 of symbol positions 604 has been increased by one unit. As can be seen, the symbols 610 selected for display that are shown in FIG. 7 are retained in FIG. 8, the array 602 has been grown in size to include the symbol positions 604 on row 4 (newly added symbol positions 616, which are emphasized, in this example, by a glowing halo effect around row 4), and additional symbols 610 have been caused to be displayed in the symbol positions 604 that were newly added to the array 602 as result of the array growth. In some implementations, if the symbols 610 that are displayed in the symbol positions 604 that were newly added include one or more array growth symbols 612 that cause the array growth condition to be satisfied again, then a further growth of the array 602 may be caused to occur. However, in other implementations, such further growth may not be allowed to occur, e.g., a maximum of only one array growth operation may occur per game play.

While not shown, additional array growth symbols 612 that may be displayed in future feature game plays and that satisfy the array growth condition may cause additional growth of the array 602 of symbol positions 604 (up to the maximum second dimension of the array 602 permitted).

Figure 9:
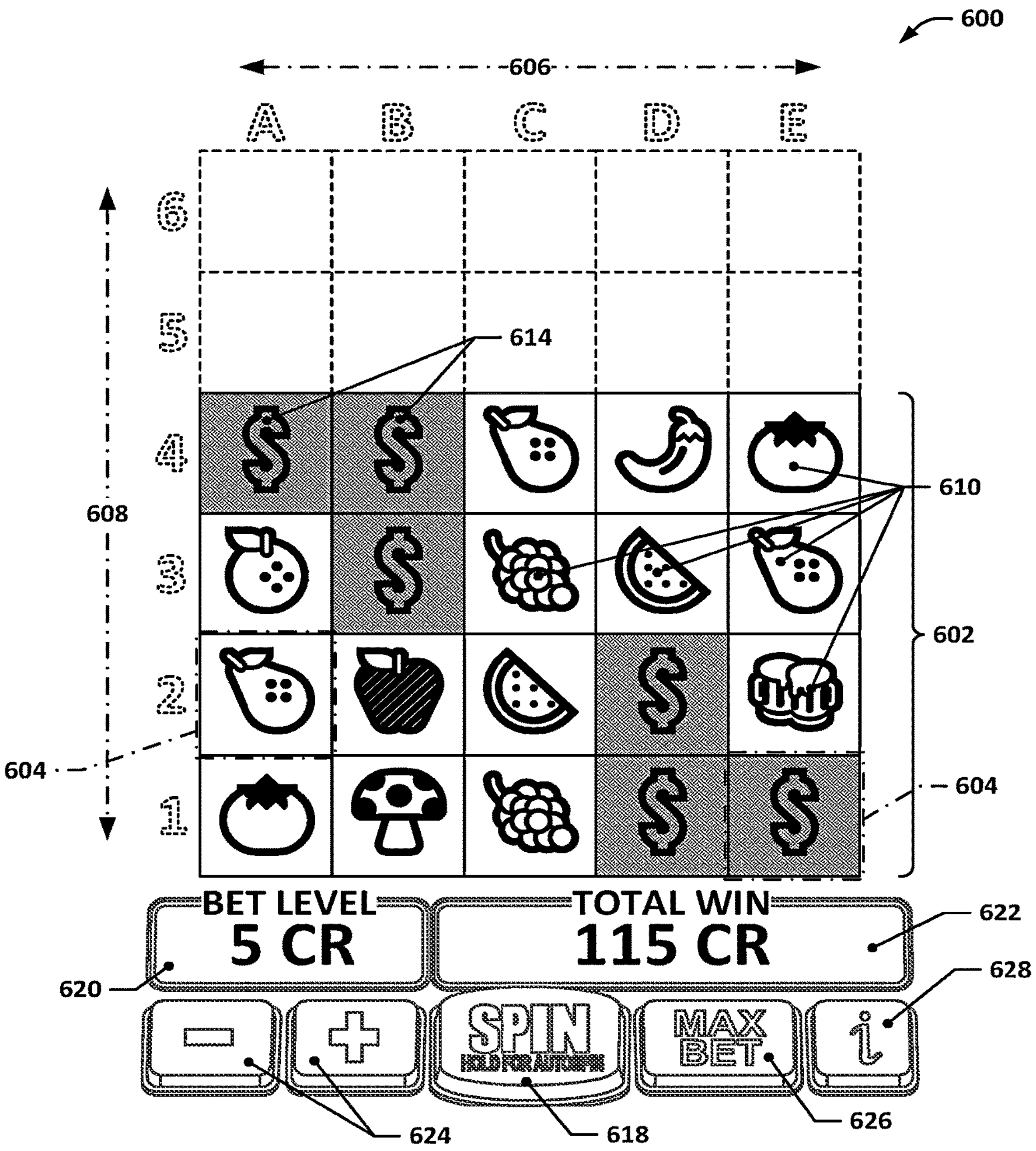
FIG. 9 depicts the example GUI of FIG. 8 after feature game trigger symbols meeting a feature game trigger condition have been displayed.

FIG. 9 depicts the example GUI of FIG. 8 after feature game trigger symbols meeting a feature game trigger condition have been displayed. As can be seen, feature game trigger symbols 614 have been shown in the array 602 of symbol positions 604; the feature game trigger symbols 614 are also symbols 610 (although not called out as such). In this case, there are six feature game trigger symbols 614, collectively, shown in the symbol positions 604 of the array 602, which, in this example, satisfies a feature game trigger condition that requires at least six feature game trigger symbols 614 to be displayed in the array 602 of symbol positions 604.

Figure 10:
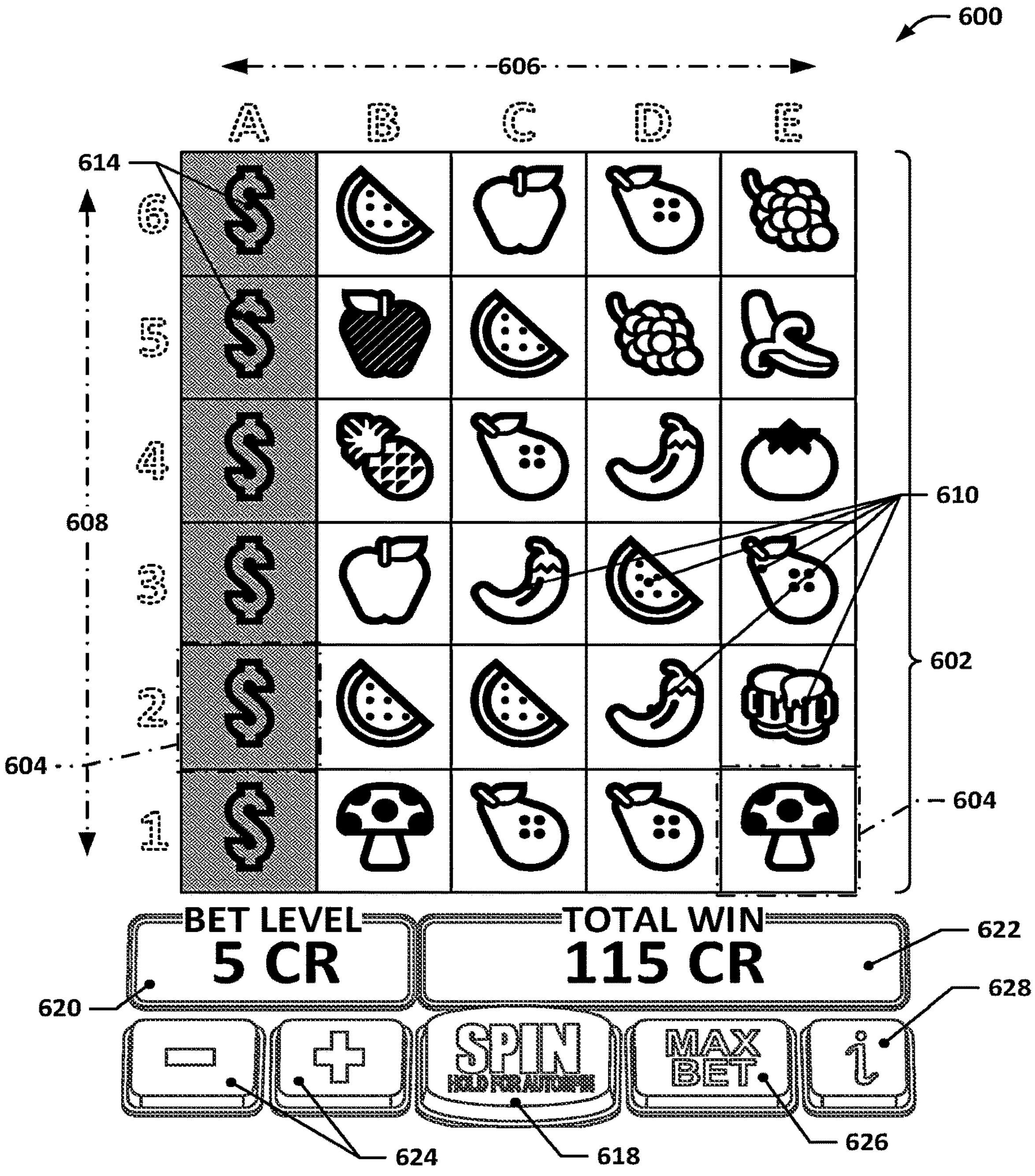
FIG. 10 depicts the example GUI of FIG. 8 after another set of feature game trigger symbols meeting the feature game trigger condition have been displayed.

It will be noticed that the feature game trigger symbols that are displayed are shown as continuous blocks within columns B and D. In some implementations, the subsets of symbols 610 from which symbols 610 may be selected for display in each of columns A-E may be associated with information that identifies the sequence or order of such symbols 610 within the subset, e.g., analogous to a virtual reel strip, and there may, in some implementations, be sequentially adjacent symbols within each subset that are feature game trigger symbols 614, which may make it more likely for such continuous blocks of feature game trigger symbols to be displayed. In some such implementations, there may be one or more blocks of sequentially adjacent feature game trigger symbols 614 that each have a number of feature game trigger symbols 614 that equals the permissible maximum second dimension value for the array 602. Such an arrangement would, in the example above, permit the feature game trigger condition discussed above for this example to potentially be met based on the selection of symbols from a single subset of symbols, e.g., from a single virtual reel strip. For example, if each column A-E displays symbols selected from a different corresponding subset of symbols 610, and each subset of symbols included 100 symbols in which six sequentially adjacent symbols were feature game trigger symbols 614, then there would be a 1 in 100 chance for each of the columns when the array 602 is in its fully grown state (in this example, having six rows) to show the entire contiguous block of feature game trigger symbols 614, as shown in FIG. 10 (in FIG. 10, the array has been expanded to have a second dimension with a value of 6). This may be visually appealing to the player in addition to significantly increasing their chances of satisfying the feature game trigger condition. In other implementations, however, there may be feature game trigger symbols that are arranged differently within each subset of symbols, e.g., not necessarily all in a sequentially adjacent manner.

Figure 11:
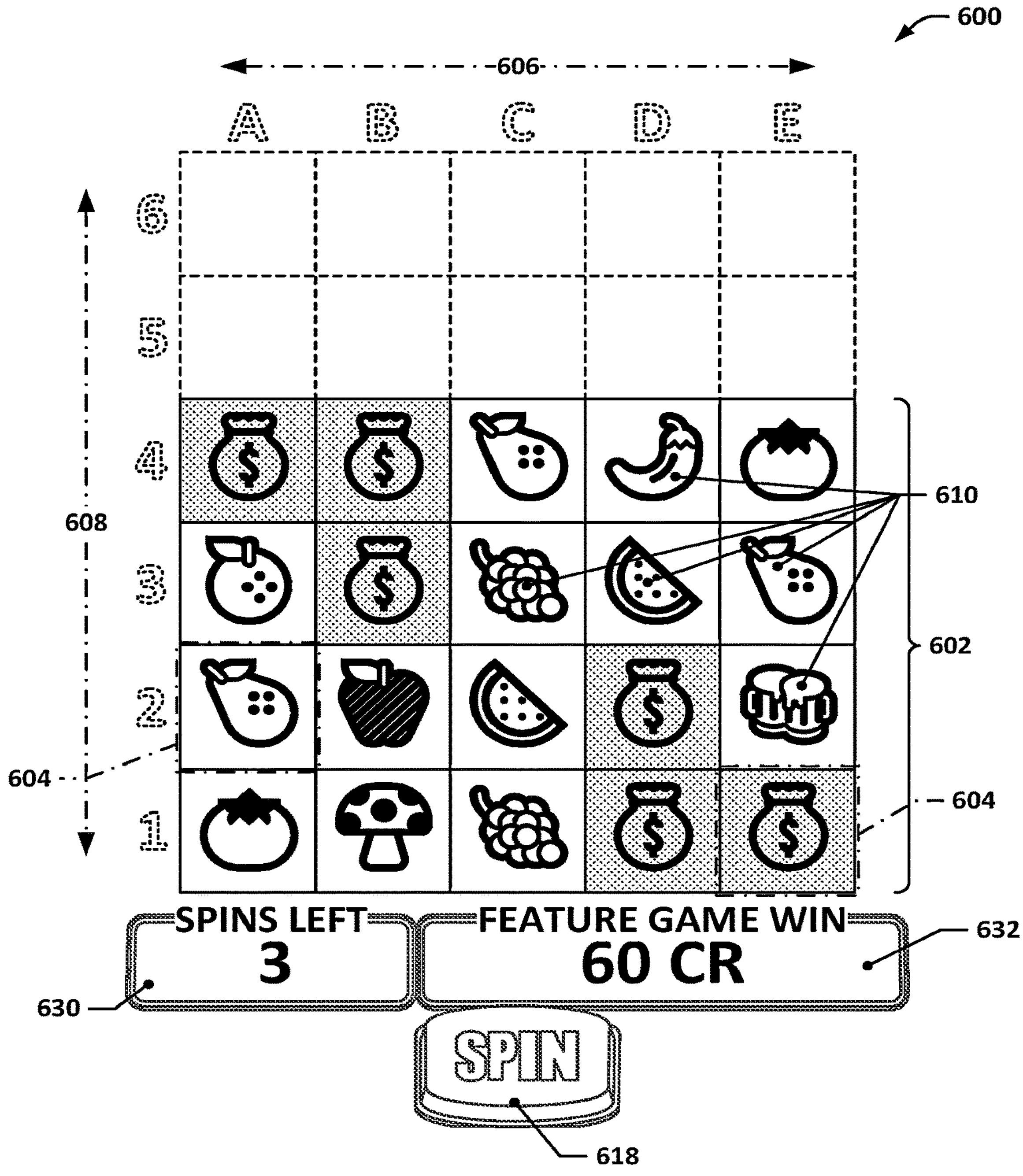
FIG. 11 depicts an example GUI for a feature game that is initialized based on the main game state shown in the example GUI of FIG. 9.

FIG. 11 depicts an example GUI for a feature game that is initialized based on the main game state shown in the example GUI of FIG. 9, i.e., with a second dimension with a value of 4. The feature game, in this example, retains much of the graphical appearance of the main game, retaining the array 602 of symbol positions 604 in the growth state that the array 602 was in when the feature game was triggered. Additionally, the symbols 610 that are shown in each of the symbol positions 604 in the array 602 are the same as they were in the main game when the feature game was triggered. In some implementations, however, the symbols displayed in the array of symbol positions at the start of the feature game may be randomly selected as opposed to re-using the symbols shown in the array of symbol positions upon triggering of the feature game.

As discussed earlier, the feature game symbols may be different from the feature game trigger symbols or may be the same, depending on the implementation. In some implementations, they may effectively be the same except in appearance, e.g., a different graphic may be used for the feature game symbol in place of the graphic for the feature game trigger symbol, but the number and sequential positioning of each such symbol within each subset of symbols may remain the same. In such implementations, the only real difference between identical feature game trigger symbols and the feature game symbols may be in how the symbols are used in the main game and the feature game. For example, in the main game, the display of such symbols may, as discussed above, be used to determine if a feature game trigger condition has been met, whereas in the feature game, the display of such symbols may determine an award that is determined at the conclusion of the feature game and may also cause the remaining plays counter to be reset; such symbols may also be treated as “sticky” in the feature game as opposed to non-sticky in the main game.

In some implementations, the feature game symbols may, like the feature game trigger symbols, be included in one or more sets of symbols from which symbols are selected during game play. In some implementations, the set or sets of symbols from which symbols are selected for display during main game play may not have any feature game symbols but may instead have at least one feature game trigger symbol, and the set or sets of symbols from which symbols are selected for feature game play may not have any feature game trigger symbols but may instead have at least one feature game symbol.

In the depicted example, the feature game symbols are depicted by money bag symbols and the feature game trigger symbols by dollar signs. When the feature game is initiated, the dollar sign symbols (feature game trigger symbols) may, for example, be replaced by money bag symbols (feature game symbols). In view of the above discussion, however, it will be appreciated that should the same symbol(s) be used for both the feature game trigger symbols and the feature game symbols, there may be no apparent difference between the symbols It will be noted that the area below the array 602 has, however, been updated to reflect the different considerations for game play that may be relevant for the feature game. For example, the wager amount indicator 620 has been replaced with a "spins left" counter 630 (a "remaining play counter" in the previous discussion above) that indicates the number of feature game plays remaining—in this case, the counter reflects that the player has three spins or plays of the feature game remaining. The total amount won indicator 622 has also been replaced with a feature game win indicator 632, which may indicate to the player how much they have accrued in winnings from the feature game play thus far, e.g., if the feature game were to conclude without any further winnings the displayed amount would, in some implementations, be the amount or minimum amount that the player would win as a result of playing the feature game. In some other implementations, this information may be displayed in conjunction with the total amount won indicator 622 or not at all. The bet increment/decrement button 624, the max bet button 626, and the information button 628 have all been hidden/removed from view, although this is optional.

Figure 12:
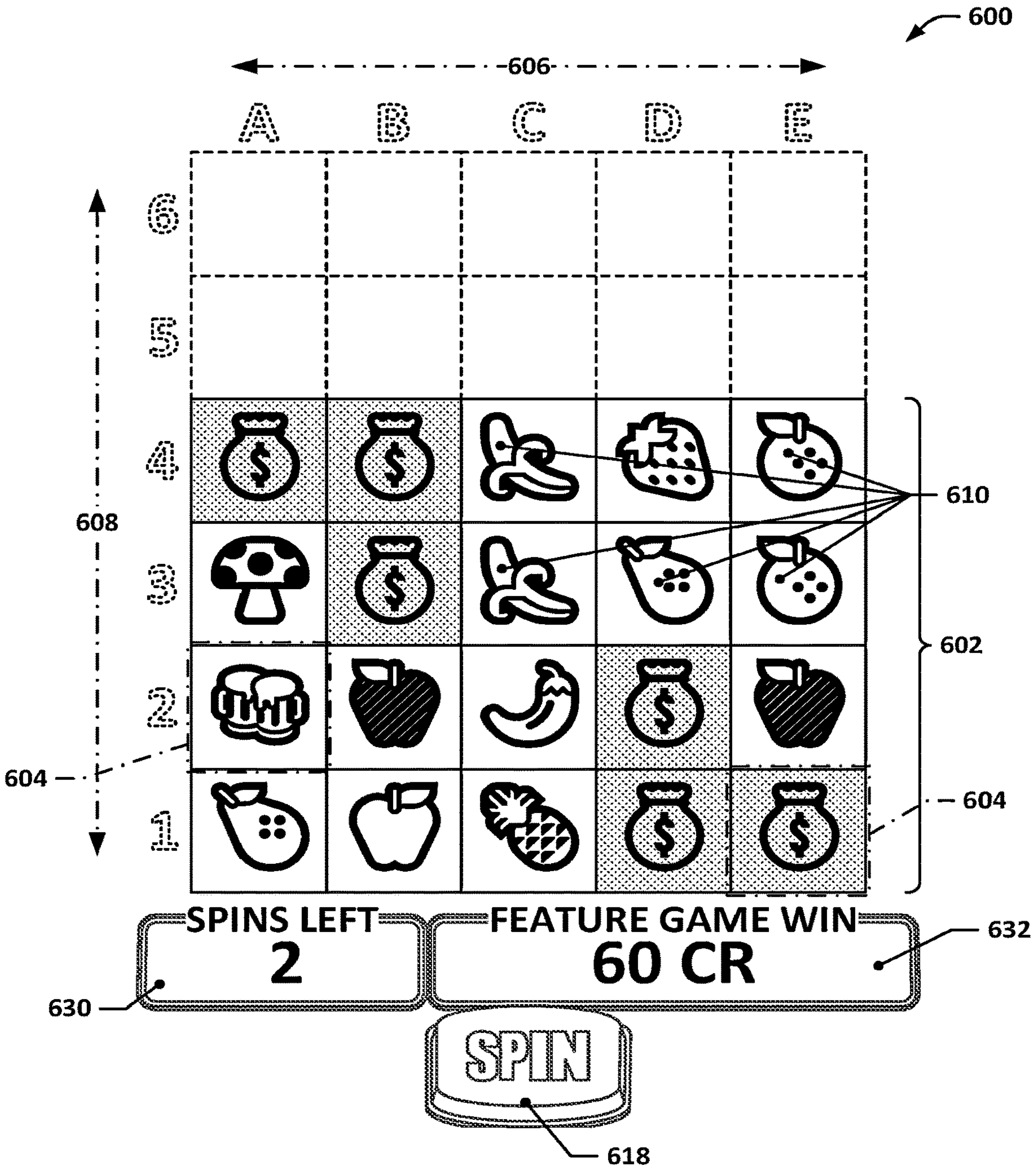
FIG. 12 depicts the example GUI of FIG. 11 after a play of the feature game.

FIG. 12 depicts the example GUI of FIG. 11 after a play of the feature game. As can be seen, the plays remaining indicator 630 has been decremented by one unit responsive to play of the feature game, and the symbol positions 604 in the array 602 that did not have any feature game symbols 615 displayed have had newly selected symbols 610 displayed therein. In this particular implementation, the feature game is configured to not make determinations regarding winning patterns of symbols as was done in the main game. In effect, the only outcome of the feature game play that resulted in the GUI of FIG. 11 is that the plays remaining indicator 630 was decremented by one unit and new symbols 610 were selected and displayed for some of the symbol positions 604; no change to the player's credits and no additional growth of the array 602 occurred.

Figure 13:
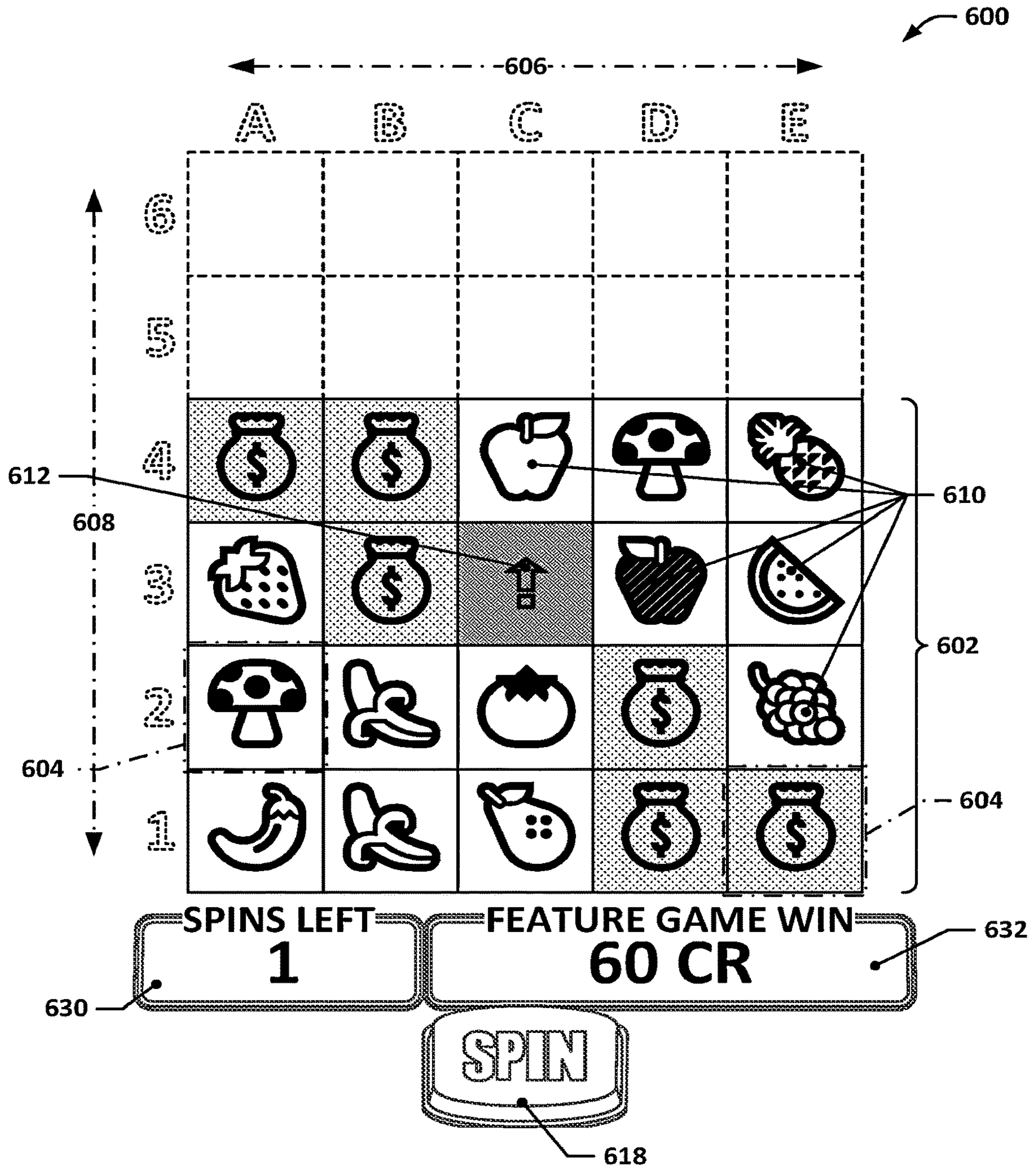
FIG. 13 depicts the example GUI of FIG. 11 after another play of the feature game in which an array growth symbol is displayed in one of the symbol positions.

FIG. 13 depicts the example GUI of FIG. 11 after another play of the feature game in which an array growth symbol 612 is displayed in one of the symbol positions 604. While this results in the second dimension of the array 602 being incremented by 1 unit, as occurred earlier with respect to FIGS. 7 and 8, the plays remaining counter 630 may nonetheless be decremented by one more unit since no feature game symbol 615 was displayed as a result of the most recent play of the feature game. As discussed earlier, in some implementations, symbols selected responsive to a game play (be it of the main game or the feature game) may be selected from different sets of symbols. In some such instances, one of the sets of symbols may have feature game symbols but no array growth symbols, and another of the sets of symbols may have array growth symbols but no feature game symbols, which may allow for scenarios in which a game play, e.g., of the feature game, may potentially result in either one or more array growth symbols being displayed or one or more feature game symbols being displayed, but never a combination of both symbols. It will be recognized, however, that other implementations may be configured to select symbols from a set of symbols that includes both feature game symbols and array growth symbols, thereby allowing for potential instances in which both types of symbol are selected for display responsive to the same input provided via the play button 618.

Figure 14:
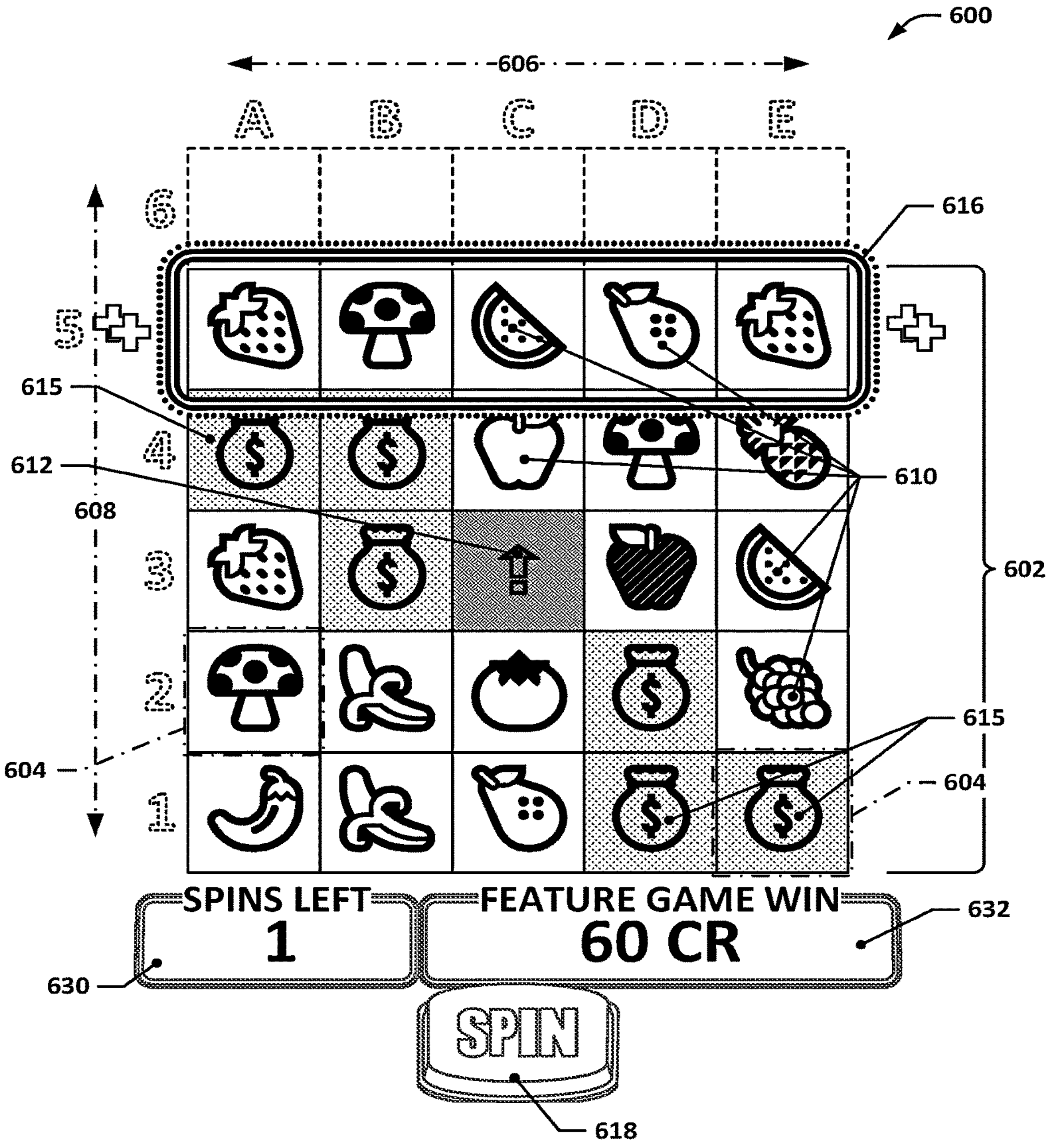
FIG. 14 depicts the example GUI of FIG. 11 after the second dimension of the array of symbol positions has been increased by one unit.

FIG. 14 depicts the example GUI of FIG. 11 after the second dimension of the array 602 of symbol positions 604 has been increased by one unit. This increase of the second dimension is similar to that shown in FIG. 8 but adds a fifth row of newly added symbol positions 616 to the array 602, along with symbols that are selected for display therein.

Figure 15:
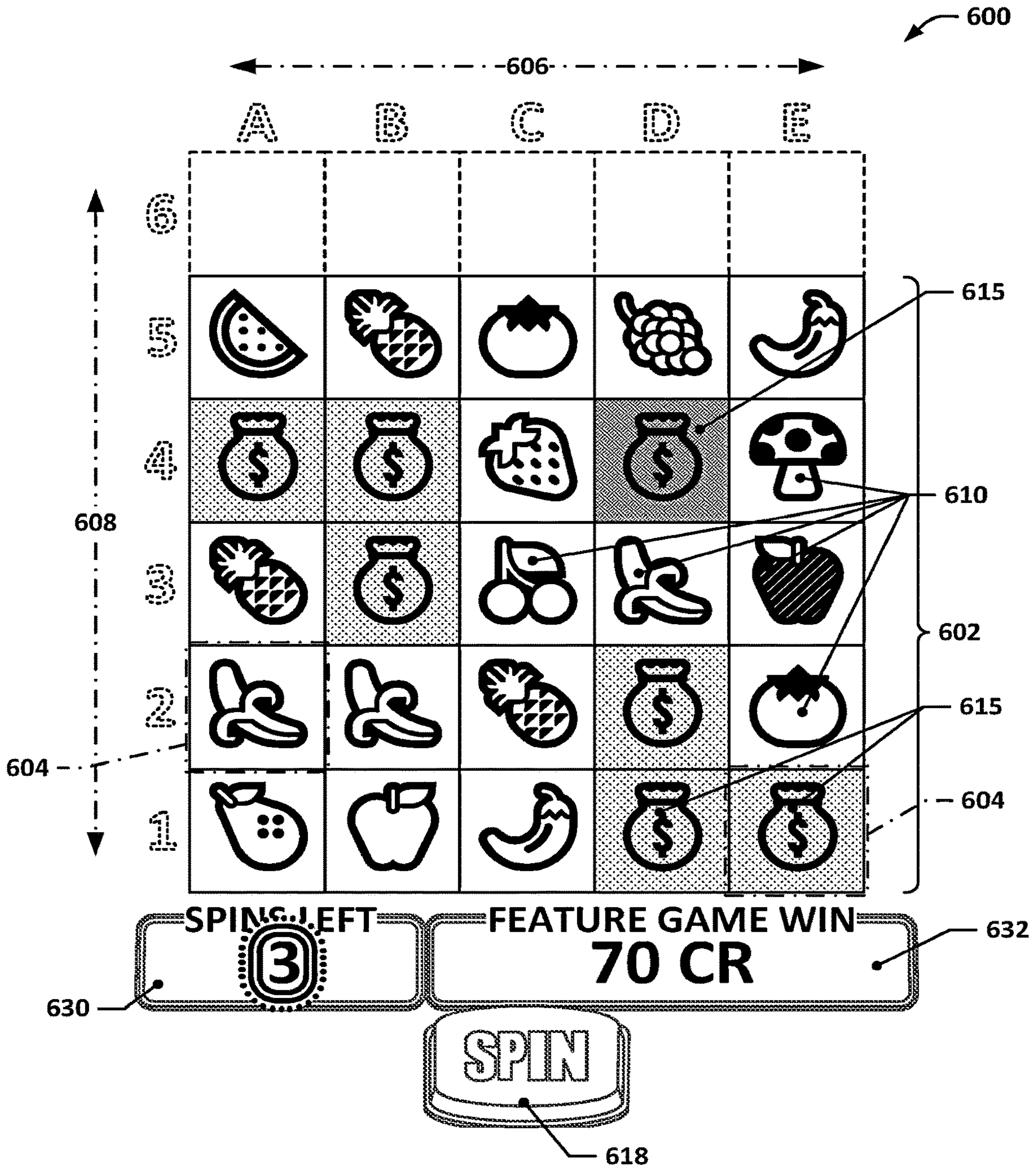
FIG. 15 depicts the example GUI of FIG. 14 after a further play of the feature game in which another feature game trigger symbol has been newly displayed in the GUI.

FIG. 15 depicts the example GUI of FIG. 14 after a further play of the feature game in which a feature game symbol has been newly displayed in the GUI. As can be seen, one of the newly displayed symbols is another feature game symbol 615 that is shown in symbol position D4 (shaded darker than the other feature game symbols 615), the display of which, for this particular implementation, satisfies the remaining plays counter reset condition. The remaining plays counter reset condition, in this example, causes the remaining plays counter 630 to be reset to its initial value when one or more feature game symbols 615 are newly displayed as the result of a feature game play. In this example, the remaining play counter 630 has been reset to the initial value of 3. A graphical highlight may emphasize this change to the player, as indicated by the glowing halo effect around the number 3 in the remaining play counter indicator 630.

Figure 16:
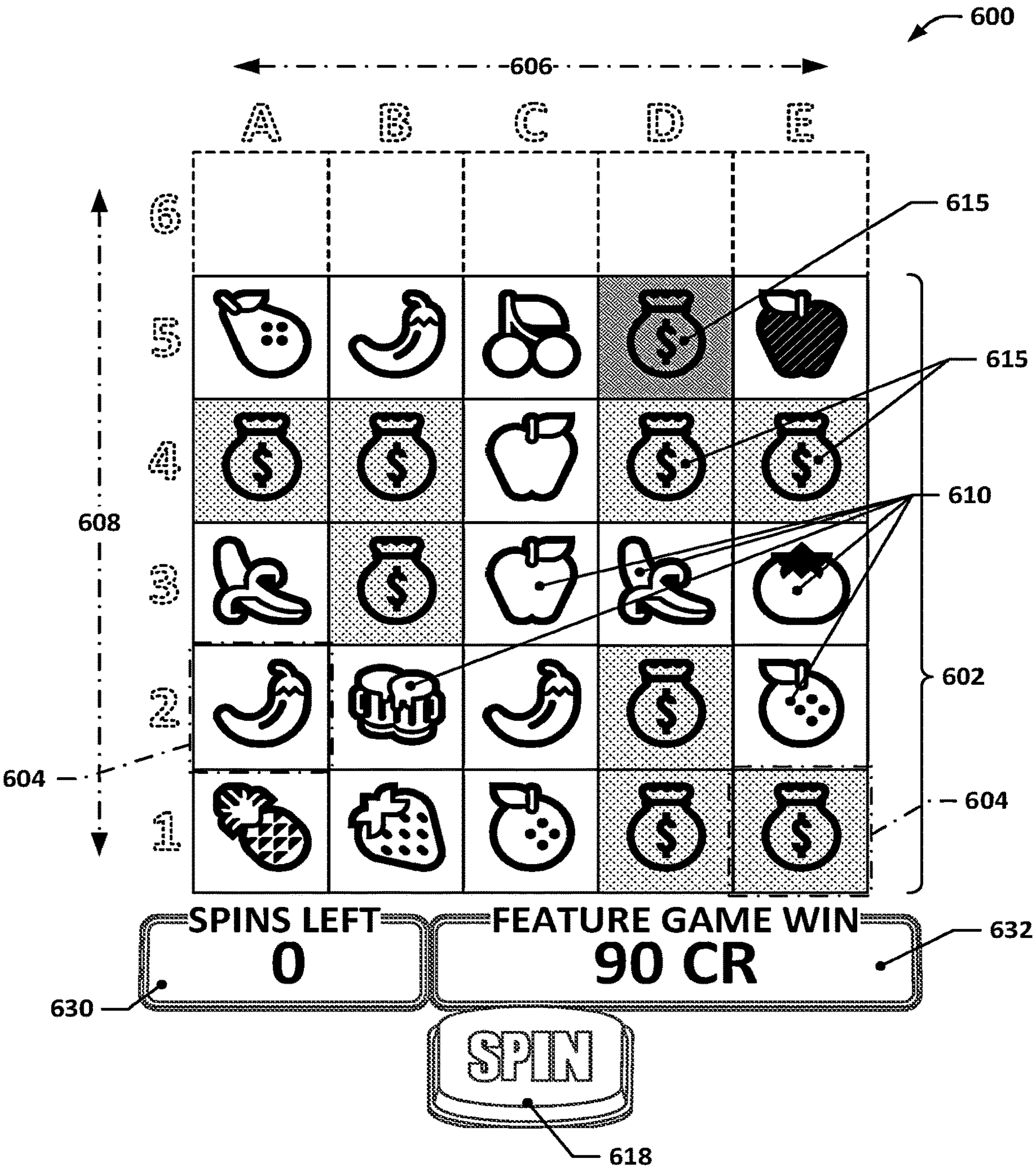
FIG. 16 depicts the example GUI of FIG. 14 after the feature game play has concluded due to the available play counter being decremented to zero.

Feature game play may continue until either the remaining plays counter 630 drops to zero or until the entire array 602 of symbol positions 604 is filled with feature game symbols 615. FIG. 16 depicts the example GUI of FIG. 14 after the feature game play has concluded due to the available play counter being decremented to zero. As can be seen, the feature game play has concluded with no additional growth to the array 602 and with only two additional feature game symbols being shown.

Figure 17:
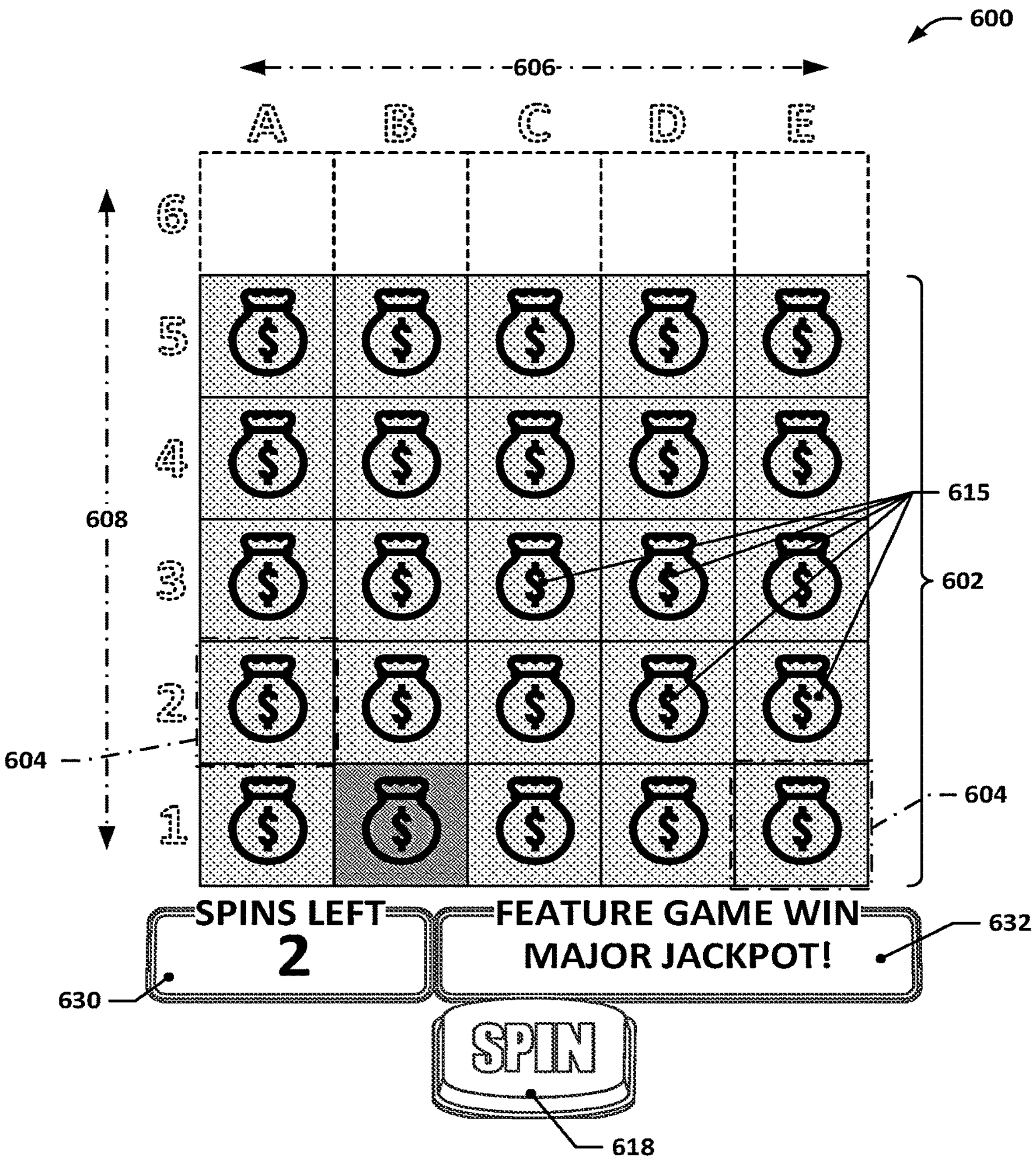
FIG. 17 depicts the example GUI of FIG. 14 after the feature game play has concluded due to all of the symbol positions being filled with feature game trigger symbols.

FIG. 17 depicts the example GUI of FIG. 14 after the feature game play has concluded due to all of the symbol positions 604 being filled with feature game symbols 615. As can be seen, there are still two plays left according to the remaining play counter 630, but since there are feature game symbols occupying all of the symbol positions in the array 602, the feature game may be deemed to have been concluded, and the player's feature game score or winnings may be determined and associated with the player.

The condition shown in FIG. 17 may be referred to as a "blackout" condition, e.g., where all of the available symbol positions may be filled with feature game symbols. Feature games that terminate as a result of such a condition or that display such a condition when the remaining plays reach zero may, in some implementations, be configured to provide for an increased point or credit award. For example, such an outcome may make the player eligible to receive a jackpot award, e.g., a mini, minor, major, or grand jackpot award. In some such implementations, the size of the jackpot award may be based on the amount by which the array 602 has been grown by at the time the blackout condition occurs. For example, in the depicted array 602, if a blackout condition is obtained with no growth (3×5 array), the player may be credited or awarded with a mini jackpot. If a blackout condition is obtained with one extra row (4×5 array), then the jackpot may be a minor jackpot; if obtained with two extra rows (5×5 array), then the jackpot may be a major jackpot. And if obtained with three extra rows (6×5 array), then the jackpot may be a grand jackpot.

Feature games such as that described above may belong to a class of feature games that are commonly referred to as "hold & spin" games, referring to the game mechanic in which certain symbols, once displayed, are "held" in place for future plays (spins) of the game. Thus, each game play of such games may be thought of as including a "hold" phase in which any feature game symbols are caused to be "held" in place followed by a game play (spin) in which the non-feature game symbols are replaced based on, for example, a new "spin" or selection of symbols. The "spin" refers to the way in which symbols were traditionally selected on non-electronic gaming machines, e.g., by spinning a set of reels.

The above-discussed main/feature games with persistent symbol position array growth may provide several advantages in terms of maintaining player interest and thereby potentially increasing the potential revenue that may be generated from an electronic gaming machine providing such games. For example, through appropriate configuration of the symbols within each set, as well as the inclusion of various other features that may allow for tuning of the RTP contribution between various features, main/feature games with persistent symbol position array growth may be configured to provide consistent RTP to the player regardless of what wager or bet level is used to place wagers in the main game. In such implementations, the electronic gaming machine may be configured to allow the player to change their bet level without resetting the array to its original dimensions. This allows the player to switch between higher-denomination wagers and lower denomination wagers, or vice-versa, when the array 602 has been "grown" to a larger size without having to worry about the main game re-setting the symbol array size. This allows the player to throttle up or throttle down their wagering rate without penalty in terms of their RTP, providing greater flexibility to the player and more control over their gaming experience.

Such implementations may, for example, be achieved by having multiple sets of symbols, wherein the symbols selected for display in an array of symbol positions having a second dimension of a particular size may be selected from a set of symbols that is associated with that particular size. For example, for a game in which the array can be grown by three levels, and thus have four levels of size (original+three increased sizes), there may be at least four sets of symbols, with at least one different corresponding set of symbols associated with each of the four size levels for the array. In practice, this is similar to having four separate games, each with its own underlying math and symbol sets that are selected such that the RTP for any one of the different array sizes is essentially the same as for the other array sizes.

Since the main variable is the size of the array and since the array size changes dimensionally, there is generally a practical limit to the number of times the array can be grown given the real estate on the display. This, in turn, limits the number of separate symbol sets and RTPs that may need to be adjusted in order to maintain a nearly constant RTP for such a game. In contrast, if array growth symbols were instead to only grow a single column or row by one symbol position, rather than add an entire column or row of symbol positions, the number of different symbol sets that would need to be managed in order to maintain a relatively constant RTP regardless of the growth level would be much greater.

For example, if one considers a 3×5 array that is growable to a 6×5 array by adding a new row thereto for each such growth, e.g., as discussed above, at least four sets of symbols might be needed, one for each tier of growth, in order to attain generally equivalent RTPs for each array size. However, if the same 3×5 array were to be growable by one symbol position at a time, e.g., if each column of the array is grown by one symbol position responsive to an array growth symbol being shown in that column (to a max height of 6 symbol positions in any given column), at least 244 sets of symbols would likely need to be separately defined in order to have the same RTP regardless of number of symbol positions being used. This requires significantly more effort and makes the configuration of such implementations dauntingly complex compared to the array-growth games discussed above.

In some implementations, there may be an additional feature of such games that provides a separate source of RTP. For example, the total RTP may include contributions from various aspects of the game, such as a portion that is attributable to credits won from outcomes in the main game, another portion that is attributable to credits won from outcomes in the feature game, and one or more other portions that are attributable to other features of the game, such as, for example, a free spins feature. The variations in RTP that may occur in the feature game RTP due to the permanence of the array growth feature from the main game may be caused to be offset by complementary variations in RTP for the other game features, e.g., a free spins feature, that may be modified to have an RTP that increases or decreases in step with the decreases or increases in RTP that the feature game may experience.

From a configuration standpoint, the expandable reel-type game of chance discussed above may be thought of, in some sense, as multiple different games that gameplay may freely switch between during play of the game of chance, depending on the outcome of any given play of the game of chance. Thus, for example, a game of chance with three stages of reel expansion (and thus four reel-expansion states—a base state, a base state+1 additional row of symbols, a base state+2 additional rows of symbols, and a base state+3 additional rows of symbols) may be treated as if it is actually four different games of chance. Thus, the game of chance may, in each reel-expansion state, operate according to different parameters that define the probabilities of different outcomes. For example, the symbols that are selected and displayed for each reel responsive to a play of the game of chance may be selected from different virtual reel strips for each different reel-expansion state. Thus, for example, there may be a first set of reel strips from which symbols are selected for the reels when in the non-expanded reel state, a second set of reel strips from which symbols are selected for the reels when in the first expansion state, a third set of reel strips from which symbols are selected for the reels when in the second expansion state, and a fourth set of reel strips from which symbols are selected for the reels when in the third expansion state.

The reel strips in each of the first through fourth reel strip sets may have different pools of symbols in them. It will be understood that the pool of symbols in a given reel strip will include multiple different types of symbols and information that determines the probability that a given type of symbol will be selected for display when symbols are randomly selected from that reel strip. For example, a reel strip may consist of an ordered list of 100 symbols. Each symbol position in the reel strip may correspond to a number between 1 and 100, and a random number generator may be caused to generate a random number between 1 and 100 in order to select the corresponding symbol. In practice, such a random selection from each reel strip will typically be a set of adjacent symbols. For example, if four symbol positions from each reel are visible in a given reel expansion state, the Nth symbol and the three symbols following it in the reel strip may be selected for display when the random number generator selects the number N as an outcome (with the end of the reel strip being treated as being a continuous loop, e.g., if N=the number of symbols in the reel strip, then the four symbols selected in this example would be the last symbol in the reel strip and the first three symbols in the reel strip).

In a slot machine game—and particularly in a ways-type slot machine game—the addition of an extra row of displayed symbols for each game play will result in a greater chance of winning outcomes if the underlying reel strip sets remain the same in between expansion states. For example, a given set of reel strips may have symbol pools that are selected to produce various probabilities of different outcomes occurring (and may thus define an RTP). However, these probabilities are generally only valid if the framework of the game, e.g., the reel symbol display area, in which the reel strip sets are used stays the same. If the reel symbol display area increases in size, allowing more symbols to be displayed for a given game play (and allowing more opportunities for winning combinations of symbols to be displayed), then this will result in the chance of winning outcomes being selected increasing with each reel expansion (assuming that the reel strip sets stay the same for all reel expansion states). For example, in a ways game that expands from 3×5 to 4×5 to 5×5 to 6×5 (rows×columns), as with the example discussed above, the first reel expansion state (4×5) may allow for over 4× more potential paylines (and thus winning outcomes) for a given game play as compared with the base reel expansion state, while the second expansion state (5×5) may allow for almost 13× more potential paylines, and the third expansion state (6×5) may allow for 32× more potential paylines.

While it is possible to design a single set of reel strips that may be used in all four expansion states to achieve a desired overall RTP for the game of chance, such an approach will necessarily need to have reel strips that are configured to provide extremely low chances of achieving a winning outcome in the base expansion state so that those same reel strips do not provide an unsustainably high chance of achieving winning outcomes in the other expansion states. This will result in a very unappealing game play experience, as the player will feel like the chances of winning in the base expansion state are extremely low, requiring a significant investment of time and resources in order to achieve a winning outcome.

In order to address this issue, each expansion state may have a corresponding reel strip set with symbols (and their probabilities of occurrence) that are selected so as to produce a particular overall RTP for that expansion state. However, since each reel-expansion state may have a different RTP, this may encourage play of the game of chance at, for example, a low wager amount at the base expansion state or lower expansion states until the symbol display area is expanded to the first, second, or third expansion state, at which point the player may switch to a higher wager amount (because such a game would typically have higher RTPs in higher expansion states as compared to in lower expansion states). In order to prevent (or at least nullify) such player behavior, such a game of chance may be configured to either reset the expansion state when the player switches wagers or, for example, maintain different instances of game play for different wager amounts. For example, the game of chance may offer three different wager amounts and would track what the expansion state was for each wager amount. If a player were, for example, to reach the third expansion state while making lowest-denomination wagers and then switch to making highest-denomination wagers, then the game of chance may reset the expansion state to the base (first) expansion state. If the player then switches back to the lowest wager amount from the highest wager amount, then the game of chance may switch back to presenting the game of chance in the third expansion state. Thus, the expansion state associated with each potential wager amount may be maintained in memory and used by the game of chance in conjunction with whatever wager amount is presently being used by the player.

In some implementations, however, the reel strip sets may be configured with symbols such that the reel strip set for each reel expansion state produces the same, or nearly the same, overall RTP. For example, if the game of chance is one that is played for social gaming currency or other non-regulated currency or that is otherwise not subject to strict regulation, the reel strip sets may be configured to each provide nearly the same overall RTP regardless of which expansion state and associated reel strip set are in use, e.g., within ±1%. If the game of chance is one that is played for actual money and/or is subject to strict regulatory oversight, then the reel strip sets may be configured to each provide the same overall RTP regardless of which expansion state and associated reel strip set are in use, e.g., within ±0.1%.

If such an approach is pursued, then the game of chance may be configured to switch between the different expansion states freely during game play and without regard for changes in wager. This allows the player to freely switch between wager amounts without the current expansion state potentially being lost (to a reset) and without the expansion state being reset to a level that is specific to a particular wager amount. Thus, the player is free to wager at whatever rate they please, without any interruption in game flow or game experience, and without any effect on overall RTP.

Such an approach may be further refined, as suggested earlier, by adjusting the reel strip set for each expansion state such that different elements of game play contribute differently to the overall RTP. For example, the game of chance may have several mechanisms by which players may be rewarded—each such mechanism may have a corresponding probability of being triggered. Thus, each such mechanism may, according to its probability of occurrence (and the nature of the amount won when triggered), make a corresponding contribution to the overall RTP of the game of chance. For example, in a game-of-chance similar to that discussed herein, there may be multiple mechanisms that allow a player to be rewarded responsive to a game play. In a typical such game of chance, the base game (in this case, a ways-type slot game) may provide a payout whenever a winning combination of symbols appears in any of the "ways" (any combination of one symbol from each column). This is one mechanism for providing player payouts. The feature game, e.g., such as a hold and spin game, may provide another mechanism for providing a payout to a player. This is another mechanism for providing player payouts. Yet another mechanism that may be used to provide payouts to the player is a free games feature, e.g., in which the player is permitted a number of plays of the base game that do not require that player actually wager any of their own money but which will award a payout to the player as if the player actually had placed a wager should the player obtain a winning outcome during the free game feature.

Each of the mechanisms in the game of chance for providing payouts to the player may make an associated RTP contribution to the overall RTP. For example, if the overall RTP is 90%, the reel strip set that is used to provide that overall RTP may have a set of symbols that is selected such that the RTP contribution from the base game is 40%, the RTP contribution from the hold and spin feature game is 30%, and the RTP contribution from the free spin feature game is 20%. The overall RTP would be the sum of the individual contributions of the different payout mechanism RTPs.

Some payout mechanisms may have a greater allure to players under certain circumstances. For example, in a hold and spin feature game, a player is typically given a certain number of plays, e.g., three, within which to land a special symbol—when the special symbol lands, the number of plays that the player has left is usually reset. There is thus typically an expectation on the part of players that it will be easier to continue playing a hold and spin game in games in which there are more symbol positions from the reels that are displayed, as each additional symbol position displayed represents another opportunity to land a special symbol that will prolong the hold and spin experience. Moreover, such hold and spin feature games often award the player with amounts shown on the held special symbols; the larger the symbol display area, the more special symbols may be displayed (and the more potential rewards may be obtained). As such, players tend to view a hold and spin feature game played on a larger symbol display area as opposed to a smaller symbol display area as being potentially more lucrative and thus more exciting. Accordingly, it may be desirable to configure the reel strip sets for the different expansion states such that the RTP contribution of a hold and spin feature game, for example, to the overall RTP generally increases with increasing symbol display areas (i.e., increasingly larger expansion states). "Generally increases," in this instance, means that the hold and spin RTP contribution, in general, increases as the expansion state increases, although there may be an instance or two in which the expansion state may increase but the hold and spin RTP contribution remains unchanged.

In order to offset the increased RTP contribution of the hold and spin feature game in reel strip sets for higher expansion states, the reel strips sets may also be configured so as to decrease the RTP contribution for other payout mechanisms, e.g., the base game and the free spins feature in this example. Of these two example payout mechanisms, it may be generally desirable to maintain the base game RTP contribution at a relatively stable level, as the player will spend the majority of their time playing the base game, and it would be desirable to have the game play experience of the base game (and the payout behavior thereof) remain generally similar or constant regardless of the expansion state of the reels. Thus, for example, the reel strip sets for the different reel expansion states may be configured such that each reel strip set results in a base game RTP contribution that is either the same for each expansion state or that is within some acceptable amount of variation, e.g., ±25% of the other RTP contributions attributable to the base game payout mechanism.

In contrast, the free games payout mechanism may tend to occur much less frequently than base game payouts during all stages of reel expansion. Given the rarity with which the free games feature may occur, reducing the RTP contribution attributable to the free games feature payout mechanism in reel strips sets associated with increasing reel expansion states may provide a way to offset the increase in RTP contribution that such reel strip sets may implement with respect to the hold and spin feature game with increasing reel expansion states. This allows for larger variations in hold and spin RTP contribution with escalating reel expansion states while still allowing the base game RTP contribution to be relatively non-volatile.

The above strategy may be implemented in any similar game of chance in which there are earnable "upgrades" to aspects of the game that can fundamentally change the total RTP of the game were the upgrade to be enabled without adjustment of the reel strip set used for base game play. Such upgrades may, as here, include expanding symbol display areas, but may also include other types of upgradeable base game features.

Generally speaking, each upgrade level (or combination of upgrade levels, e.g., if there are two or more different aspects that may each be upgraded in parallel) may have a corresponding reel strip set (or other symbol set from which symbols are selected randomly in order to provide a game outcome) that is configured to potentially provide game outcomes that may result in a potential payout or payouts to a player for a given play of the game of chance via any of a plurality of different payout mechanisms. For example, if a reel symbol display area is able to be upgraded by both adding up to two additional rows of symbol positions and/or up to two additional columns of symbol positions, there may be 9 different combinations (e.g., 0/0, 1/0, 2/0, 0/1, 0,2, 1/1, 1/2, 2/1, 2/2, with the first number representing the number of additional columns and the second number representing the number of rows) of such upgrades, each of which may have a separate reel strip set associated therewith.

Payout mechanisms, for the sake of this discussion, may be understood to refer to different types of outcomes that are in some way differentiable from one another. For example, a single payout mechanism may, as discussed above, include all of the ways in which a player may be awarded credits as a result of obtaining a ways or payline outcome having any of several payline patterns. Any individual set of criteria that result in the payout of an award if met may technically be viewed as a payout mechanism. However, it is common to group payout mechanisms that are variants on a common theme, e.g., all base game outcomes, as a single payout mechanism and to treat the sum of the RTP contributions from each such individual payout mechanism as being representative of the "grouped" payout mechanism.

A given game of chance may have may a plurality of payout mechanisms that may each be associated with a different aspect of game play, e.g., the base game, a hold and spin feature game, a free game feature, a sticky wilds feature, a spin the bonus wheel feature, a pick bonus feature, a board game bonus feature, etc.

The total RTP of a game of chance will, it will be understood, be equal to the sum of the respective RTPs that are attributable to all of the payout mechanisms in the game of chance.

A game of chance such as the above may be configured to have reel strip sets (or symbol sets) from which symbols are selected in the base game that may be configured such that each reel strip set provides a total RTP for the game of chance (using that reel strip set) that is equal (or nearly equal, as discussed earlier) to the total RTP for the game of chance using any of the other reel strip sets. However, at least some of the reel strip sets may also be configured such that the respective RTP contributions of at least two pairs of the same payout mechanisms in those reel strip sets are different. Thus, if there are payout mechanisms A/B/C/D in a given game of chance, the sum of the RTP contributions for the payout mechanisms A, B, C, and D for a given symbol set will be the same for each symbol set (each symbol set being associated with a different upgrade level or combination of upgrade levels for the game of chance), but the RTP contributions of at least two of the payout mechanisms A, B, C, and D for at least two of the symbol sets will be different.

As discussed above, the variations in RTP contribution associated with the different payout mechanisms that may be selected with respect to each symbol set may be selected as set forth above in order to allow the game of chance to be insensitive to changes in wager level. The specific adjustments that are made to each symbol set may be selected so as to increase or decrease the RTP contribution of at least some of the payout mechanisms between two or more of the symbol sets. Depending on the nature of the payout mechanism and the nature of the upgrade level, it may be desirable to generally increase the RTP contribution of some payout mechanisms with increasing upgrade level and to decrease the RTP contribution of other payout mechanisms with increasing upgrade level.

FIG. 18 depicts several tables summarizing various parameters associated with an example game of chance that implements the above-discussed strategy. The example game of chance that FIG. 18 is directed to is a slot game featuring a 3×5 symbol reel display area that is upgradable three times to 4×5, 5×5, and 6×5 symbol reel display areas (five reels, with three, four, five, or six symbols from each reel displayed per game play depending on the expansion state). The game of chance includes several payout mechanisms, including a base game payout mechanism, a free game payout mechanism, and a hold and spin payout mechanism.

Different reel strip sets are used for the five reels in each expansion state (and potentially for each payout mechanism); the symbols that are included on the reel strips in each reel strip set are selected so as to cause the RTP contributions from at least some of the payout mechanisms to vary between the different expansion states. In this example, the base game RTP contribution is set to be the same (65%) in all expansion states, while the RTP contribution of the free game payout mechanism and the hold and spin payout mechanism are caused to decrease and increase, respectively, in 5% increments with increasingly larger expansion states. The overall RTP for each expansion state, however, can be seen to remain the same (95%). It will be appreciated that these are simply representative values used for this example, and that other implementations may use different values and/or feature variation in the base game RTP contribution as well.

Table B indicates the percentage of game plays in which each expansion state will be active during play of the game of chance, e.g., the game of chance will operate with the 3×5 expansion state (unexpanded) active approximately 40% of the time, and with the highest expansion state, 6×5, approximately 10% of the time. Table C indicates the payout mechanism RTP contribution of each expansion state scaled according to the percentage of game play that occurs in each expansion state, i.e., the values of Table A multiplied by the corresponding percentages for each expansion state in Table B. The total RTP is still, as can be seen if one sums the total RTPs in Table C, equal to 95%.

The individual RTP contribution of each payout mechanism may, it will be understood, ultimately be determined by the reel strip sets used to play the base game, but may also be dependent on the reel strip sets used when providing each payout mechanism. For example, the base game reel strip sets may be configured to as to trigger a non-base game payout mechanism, e.g., a free game feature or a hold and spin feature, according to a certain average frequency, e.g., hit rate. The hit rate, in combination with whatever the average payout is of the payout mechanism, may ultimately determine the RTP contribution of that payout mechanism. Thus, if an outcome for a payout mechanism is determined with reel strip sets (or other symbol sets) that yield a higher RTP, this will tend to drive up the RTP contribution of that payout mechanism to the overall RTP of the game of chance unless, for example, the hit rate for that payout mechanism in the base game is decreased. Thus, when base game reel strip sets are configured to generate equal total RTP across multiple upgrade levels, there may also additionally be, in some instances, adjustment of reel strip sets (or other symbol sets) that are used to determine outcomes for non-base game payout mechanisms at different upgrade levels. Of the two types of adjustments, however, tuning the base game reel strip sets will generally have the effect of changing the frequency with which the non-base game payout mechanisms are triggered, while tuning the reel strip sets (or symbol sets) for the non-base game payout mechanisms will generally alter the way that the non-base game payout mechanisms "play," which may be perceived by the player as undesirable or unpredictable behavior. Thus, it may be preferable to primarily tune the overall RTP through adjustments in the base game reel strip sets (or symbol sets) to potentially avoid such a possibility.

In the example of FIG. 18, Table D indicates the number of game plays (the hit rate), on average that will occur before the non-base game payout mechanisms (the free game and hold and spin payout mechanisms) are triggered with respect to each expansion state. For example, when the 4×5 expansion state is active, the free game payout mechanism would be triggered, on average, once every 75 game plays, and the hold and spin payout mechanism would be triggered, on average, once every 100 game plays. The probability of each such payout mechanism being triggered may, it will be understood, be governed by the symbols that are selected for each reel strip set for each upgrade level. That is, the symbols that trigger such payout mechanisms may be included in greater or lesser numbers (or otherwise manipulated) between reel strip sets so as to result in such hit rates. It will also be understood that, in some implementations, as discussed above, other reel strip sets may be used to determine outcomes for one or more of the non-base game payout mechanisms. For example, the hold and spin payout mechanism may utilize a different set of reel strips from that used in the base game. In some instances, the hold and spin mechanism may also utilize a different set of reel strips for at least two or more of the different upgrade levels.

Table E indicates the hit rates for each non-base game payout mechanism scaled by the percentage of game play that is spent in the relevant expansion state (the values of Table D multiplied by the corresponding percentages of Table B). Put another way, Table E indicates the numbers of plays that will, on average, occur in each expansion state (based on the expected percent of game play that occurs in each expansion state) before the relevant payout mechanism is triggered (regardless of in what expansion state). For example, if a player were to play the example game of chance repeatedly, they would, on average, play 24 plays of the base game in the 3×5 expansion state, 15 plays of the base game in the 4×5 expansion state, 30 plays of the base game in the 5×5 expansion state, and 15 plays of the base game in the 6×5 expansion state (or 84 plays total, regardless of expansion level) in between each triggering of the free game payout mechanism.

Table F indicates final hit rates (the sums of the individual scaled hit rates from Table E) for both non-base game payout mechanisms. The Any Feature hit rate is simply the combined odds (inverse of hit rate) of the two separate non-base game payout mechanisms inversed to produce a combined hit rate, i.e., the average hit rate for triggering either of the non-base game payout mechanisms.

Various types of games of chance may be configured to as to include aspects that are upgradable during play of a base game and then have such upgrades persist into feature game play, similar to the examples discussed above. Such games of chance may utilize symbol sets that are specific to each upgrade level or combination of upgrade levels (if multiple different aspects of the game of chance can be upgraded) so as to allow the RTP for the game of chance to remain unchanged regardless of the amount wagered. This allows the upgrade levels that a player has earned to also be persisted even when the wager amount is changed by the player. In turn, this allows the player complete freedom to change the amounts they wager without interrupting the flow of game play.

Various examples of upgradeable game play experiences that may be suitable for implementation using the above technique are discussed below.

In one example game of chance, instead of an obtained upgrade causing the symbol display area for a single reel set to expand, the obtained upgrade may cause an additional instance of the game of chance to be displayed and played in tandem with the base game but using the same wager. For example, if the player has obtained upgrades that cause two additional instances of the game of chance to be displayed, each play of the game of chance in that state will result in a single wager being made, but there will be three different game outcomes determined (one for each instance of the game of chance), each with its own chance of winning. The reel strip sets used in the game of chance for each level of upgrade may, consistent with the discussion provided above, be designed to produce the same overall RTP, regardless of the amount of wager or the upgrade level of the game of chance.

In another example game of chance, an upgradable wheel may be provided. The wheel may, for example, be radially divided into sectors, with each sector being associated with an outcome. During play of a feature game, e.g., if a base game outcome results in a wheel-spin game feature being initiated, one or more of the sectors may be randomly selected and a feature game outcome determined according to which sector was selected. At least one of the sectors may be associated with a parameter that may enhance the player's score or winnings, e.g., a credit amount, a multiplier amount, a number of free base game plays, etc. When the wheel is upgraded, e.g., responsive to an outcome in the base game (such as a particular symbol landing in the symbol display area), at least one of the wheel sectors may be enhanced, e.g., the credit amount, multiplier amount, etc., may be increased such that the player receives a greater benefit from it if it is selected during game feature play. In such an implementation, the base game may have different reel strip sets for each upgrade level of the wheel, with the appropriate reel strip set for each upgrade level used to determine base game outcomes when that upgrade level is the current upgrade level of the wheel.

In another example game of chance, the symbol display area may be upgradeable to show more reels (columns) depending on the upgrade level. Put another way, this is a version of reel symbol display area expansion that allows the reel symbol display area to grow horizontally instead of vertically or to grow both horizontally and vertically. For example a 3×5 reel symbol display area may be expandable by adding up to two more rows of symbol display positions and/or adding up to two more columns of symbol display positions (the latter would likely require that the symbol sets used for at least some of the expansion states include additional reels, or at least display symbols from additional reels). In such an example, there may be a total of nine different upgrade levels-3×5, 4×5, 5×5, 3×6, 4×6, 5×6, 3×7, 4×7, and 5×7—each of which may have an associated reel strip set that is used during base game play depending on the current upgrade level. In some games of chance that have expandable symbol display areas (expandable vertically and/or horizontally), the upgrades that result in such expansion may, for example, provide different expansion effects depending on the nature of the upgrade. For example there may be a symbol that, when landed during base game play, causes only reel symbol display area expansion in the vertical direction (or, in another instance, the horizontal direction). Some implementations may also feature upgrades in which multiple upgrade levels may be earned at once, e.g., there may be an upgrade symbol that, when landed during base game play, causes the reel symbol display area to grow in the vertical and/or horizontal directions by two levels. In some implementations of vertical expansion upgrades, e.g., vertically expanding the reel set to greater than 5 reels, reel pays can be evaluated right to left, and left to right. As an example, for an upgraded game vertically expanded to include 7 reels that pays awards for up to a 5 symbol combination, the reel symbol pays may be evaluated from reel 7 to reel 3, and/or from reel 1 to reel 5.

In some examples, a game of chance may have a reel symbol display area that is able to be upgraded in size one reel symbol display position at a time. For example, landing a reel expansion symbol on a given reel may cause the symbol display area for that specific reel to grow by one symbol display position. In such an implementation, there may be a large number of different combinations of upgrade levels, each of which may have an associated reel strip set that is used in the base game when that upgrade level is in play. For example, for a base game that has a 3×5 reel symbol display area and has an upgrade feature that allows the reel symbol display area to be increased by one or two symbol positions for each reel independently, there may be up to 243 different reel strip sets that may be associated with all of the different permutations of reel symbol display area expansion that are possible (e.g., 43333, 34333, 33433, 33343, 33334, 44333, 34433, 33443, etc., with each digit in each 5-digit number representing the number of symbol positions displayed for each of the five reels). The number of distinct reel strip sets that may be used may be reduced, in some cases, through re-use of some reel strip sets for multiple different upgrade level combinations.

In some implementations, a game of chance may be provided that has a cash-on-reel (COR) payout mechanism that draws COR symbols from an ordered pool of COR symbols. For example, the reel strips in a given reel strip set may have one or more dynamic symbols on them that may be displayed as part of a game outcome. The game may be configured such that the dynamic symbols are simply placeholders for COR symbols; each time the dynamic symbol is displayed or to be displayed as part of a game outcome, it is replaced with a COR symbol drawn from the pool of COR symbols. If the COR symbols are selected from the pool of COR symbols in order of increasing value and are then removed from the pool of COR symbols upon selection (or otherwise prevented from being re-selected in the future), this has the effect of "upgrading" the COR symbol pool so that the average value of the selectable COR symbols in the pool increases (or at least never decreases) every time a COR symbol is selected therefrom during the base game. The game of chance may also have, for example, a feature game that is triggerable from the base game, e.g., through obtaining a particular outcome. In the feature game, outcomes that display a dynamic symbol may similarly cause a COR symbol to be selected from the pool of COR symbols and displayed in place of the dynamic symbol during each play of the feature game.

The selection of COR symbols from the pool of COR symbols in the feature game may be conducted in a manner similar to the selection of COR symbols in the base game or may instead be a random selection from the available COR symbols in the pool that ignores the relative order of the COR symbols by value. Regardless, each time a COR symbol is selected in the base game, it has the effect of "upgrading" the pool of available COR symbols that will be available in the feature game. Accordingly, the pool of COR symbols may be thought of as a plurality of pools of COR symbols, with each pool having one less available COR symbols—each time a COR symbol is selected from a given pool of COR symbols, that pool of COR symbols is, in effect, replaced with the pool of COR symbols having one less COR symbol in it. Each such pool of COR symbols may, for example, have a different reel strip set that may be used in the base game to determine outcomes for the base game. However, each reel strip set may still have the same total RTP, as discussed earlier, such that the player can switch wager amounts without any effect on the pool of COR symbols. The COR symbols, for example, may award the amount shown on a given COR symbol when that COR symbol is shown in an outcome of the base game. During feature game play, however, the COR symbols may not immediately award the amount shown upon selection and display. In such implementations, COR symbols selected for display during the feature game may be retained in place until either all symbol positions have COR symbols (a blackout condition) or the feature game ends, e.g., there are X, e.g., 3, number of plays in a row in which no new COR symbols are selected. In such an implementation, the COR symbol values may be awarded upon achievement of a blackout or when the feature game ends. It will be appreciated that the pool of COR symbols may include a mix of limited-selection COR symbols and unlimited-selection COR symbols. The limited-selection COR symbols are able to be selected only a predetermined number of times, e.g., once, before no longer being selectable, while the unlimited-selection COR symbols may be selectable any number of times. For example, a COR symbol pool may, upon initialization, include values of 1/1/1/5/5/5/10/10/20/20/25/25/50 (*), with the (*) indicating an unlimited-selection COR symbol. However, an equivalent COR symbol pool might have values of 1(3)/5(3)/10(2)/20(2)/25(2)/50(*), where the number in parentheses indicates how many instances of the value preceding that number exist in the COR pool. As each COR symbol is selected, the number of instances of that COR symbol may be updated to reflect the selection. In some instances, otherwise in accordance with the preceding examples, a base game or bonus game upgrade trigger symbol may case a COR symbol value to be removed from the pool, e.g., the lowest value COR symbol may be removed from the COR symbol pool such that the lowest value COR symbol is no longer available for selection and display when a dynamic symbol lands, in the base game or bonus game.

Another example of a game of chance with an upgrade feature is a game of chance in which certain symbols on one or more of the reels are "upgradeable" during the base game and the reels with upgraded symbols on them are also used during a feature game, e.g., a hold and spin game or free games feature. For example, there may be one or more multiplier symbols on a reel that each indicate a 1× multiplier effect. During play of the game of chance, certain outcomes during the base game may result in one or more such multiplier symbols being upgraded, e.g., from 1× to 2× (or an existing 2× symbol being upgraded to a 3×, and so on). During play of the feature game, any such upgradable symbols that are displayed in association with a winning outcome may cause that winning outcome to be multiplied by the relevant, potentially upgraded, multiplier value. Alternatively, the reel strips that are used in the base game may not be used in the feature game, but the upgradable symbols (and their upgrades) that are on the base game reel strips may be transferred to, or replicated on, different reel strips that may be used in the feature game. For example, there may be separate reel strip sets for the base game and the feature game, but the reel strip sets for both the base game and the feature game may have corresponding upgradeable symbols. When the feature game is triggered and the feature game reel strip set used in determining feature game outcomes, the upgradeable symbols in the feature game reel strip set may be updated to reflect the upgrade level of the corresponding upgradeable symbols (and their upgrade levels) from the base game reel strip set. In yet another variant, the upgradeable symbols may be only located on a set or sets of reel strips for the feature game and not be located in the base game reel strip set(s). In such a variant, if an outcome that results in the upgrade of such an upgradeable symbol is obtained, the corresponding upgradeable symbol in the reel strip set(s) for the feature game may be upgraded, but the reel strip set in the base game may not reflect this change. Each upgrade level or combination of upgrade levels across multiple upgradable symbols may, in some implementations, have a different base game reel strip set associated therewith. For example, if there are a total of three upgradable symbols that are each upgradeable twice, there may be a total of nine different combinations of upgrade levels, each of which may be associated with a different reel strip set that may be used in the base game depending on which upgrade level combination is currently in play. It will be understood that while the upgradeable symbols discussed above are multiplier symbols, such symbols may also be other types of symbols, e.g., non-wild symbols that may be upgraded to wild symbols, cash-on-reel symbols that may have their associated cash value increased with each upgrade, wilds that are also multipliers (for example, each multiplier in the above example may also be treated as a wild symbol), etc. Another variant of a game of chance with upgradeable symbols that persist through to a feature game, and across wagering amounts, may include replacing lower value symbols with higher value symbols. As an example, in a game a chance using "royal" symbols (e.g., symbols 9, 10, J[ack], Q[ueen], K[ing], A[ce]) where the symbol combination award paid for a lower value royal symbol (e.g., a combination of 3 jack symbols pays 5 credits) awards a lower number of credits than a similar higher value royal symbol combination award (e.g., a combination of 3 king symbols pays 50 credits) certain outcomes in the base and/or feature game may cause an upgrade of the royals, resulting in one or more of the lower value royal symbols (e.g., jack symbols) being replaced on the reel strips by one or more higher royal symbols (e.g., king symbols).

This increases the likelihood, with each reel outcome result, of the player obtaining higher value awards as reel symbol positions previously containing with lower value symbols now contain higher value symbols.

A further variant of a game of chance with upgradable symbols in the base game that persist through to a feature game may include a sticky wilds mechanism. In such a game of chance, the sets of reel strips used during base game play may include one or more sticky wild symbols, i.e., wild symbols (which may be used in place of any other symbol in determining whether a winning pattern exists in an outcome) on one or more of the reel strips of one or more of the sets of reel strips. When a game outcome is generated that includes a sticky wild symbol, the wild symbol may, for example, remain in the symbol position that it lands in for subsequent game plays, acting as a wild in each subsequent base game play. However, such a "stuck" wild symbol may also remain "stuck" when a feature game is triggered, e.g., a hold and spin or free games feature, and may also be used in the feature game (for example, the feature game may be played in the same symbol display area in which the sticky wilds are located, or the sticky wilds may be replicated in or moved to the feature game area for use in the feature game. Thus, the stuck wild symbols may persist into the feature game and also contribute to forming winning patterns in the feature game. The number of stuck wild symbols may, in such implementations, be viewed as equivalent to the upgrade level of an upgradable aspect of the game of chance. Thus, if there are a total of three sticky wild symbols scattered across each base game reel set, the sticky wild feature may be viewed as having four levels (no sticky wilds landed, 1 sticky wild landed, 2 sticky wilds landed, and 3 sticky wilds landed). Each such upgrade level may have associated with it a different set of reel strips for the base game. The sets of reel strips may each be configured such that the total RTP for the game of chance is the same, but such that the RTP contributions of different payout mechanisms (e.g., the feature game, the base game, etc.) fluctuate, thereby allowing the game of chance to be played at different wager levels without altering the upgrade state of the game of chance. A similar game of chance may also be provided in which the sticky wild symbols are replaced with (or used in conjunction with) symbol frames or any other "sticky" mechanism.

In some games of chance, the game of chance may award a multiplier and/or increase the multiplier for each consecutive play of the base game in which a winning outcome is obtained. This multiplier may then be carried through into a feature game that may be triggerable from the base game and may be applied to an amount won in the feature game. In some cases, the multiplier may also be applied to amounts won in the base game. Each upgrade level of the multiplier may, for example, be associated with a corresponding set of reel strips for the base game. When an outcome is to be determined for the base game, the reel strip set corresponding to the current multiplier may be used. As with earlier example games of chance, each of the base game reel strip sets may be configured so as to have an equal RTP, although the various payout mechanisms that each set of reel strips may support may have different RTP contributions from reel strip set to reel strip set.

A similar game of chance may award a multiplier or increase the multiplier not for each consecutive play of the base game in which a winning outcome is obtained, but may instead do so each time a particular symbol is shown in a given outcome, for example, each time a multiplier symbol is shown. In some such implementations, the symbols that are displayed may be "tumbling" symbols, e.g., when a multiplier symbol is shown, the multiplier symbol may be removed from the position it is displayed within and the symbols located above it moved down so as to "fill" the hole that it left. The topmost symbol position in that column of symbol positions may then be filled with the "next" symbol up in the reel strip (which may not be visible until the tumbling mechanism is activated). If the tumbling causes an additional multiplier symbol to be displayed, then this may serve to multiply the previous multiplier(s) that have been earned in that game play. The multiplier may then be applied during feature game play, similar to the previous example.

In yet another example of a game of chance that may feature upgradable aspects that may persist into feature game play, some games of chance may have base game reel strip sets that feature special symbols that, when displayed as part of an outcome, cause the symbol position they land in to be marked in some way, e.g., as a zone, that persists at least until a feature game is triggered. When such a symbol lands in a symbol position that has been marked in such a manner, e.g., as a zone, it may trigger a symbol reel display region expansion, e.g., adding a row (or rows and/or a column or columns) of symbol positions to the symbol reel display region. When a feature game is triggered by an outcome in the base game, the reel display area expansion state may be carried through into the feature game, and in some cases, the marked display positions may be used in the feature game (if the feature game uses the same symbol display area as the base game) or may be transferred or replicated in the feature game display area. In either case, the marked symbol positions may be configured to enhance the player's score in some manner in the feature game, e.g., each such marked symbol position may be treated as a multiplier value or the number of such marked symbol positions may be treated as a multiplier value. Each additional marked symbol position may be viewed as an upgrade level, and the base game may have different reel strip sets that correspond with, and are used with, different numbers of "marked" symbol positions.

In some implementations, games of chance with upgradable aspects may include, for example, games of chance with expandable reel symbol display areas, as discussed earlier herein. Some such games of chance may, at the conclusion of the feature game, reset the expansion state of the symbol display area to a default value, e.g., to a non-expanded state. Other such games of chance may, however, reset the expansion state of the symbol display area to a different value, e.g., to an expansion state that is one level lower than the current expansion state. In some such implementations, at the conclusion of the feature game, e.g., at the end of a hold and spin feature game, the player may be presented with multiple options to select from. Each option may be associated with a different effect on the expansion state, but the exact nature of the effect may not be known until after a selection of an option and subsequent application of the effect associated therewith. The various effects may include, for example, lowering the expansion state of the symbol display area by 1 or more upgrade levels, raising the expansion state of the symbol display area by 1 or more upgrade levels, resetting the expansion state of the symbol display area to a default or minimum level, and/or resetting the expansion state of the symbol display area to a maximum level. If each expansion state is associated with a base game reel strip set that results in the same overall RTP, then the transitions between different expansion states will not affect the RTP of the game of chance, thereby allowing the player to change wager amounts freely.

In some implementations, games of chance with upgradable aspects may include, for example, games of chance with expandable reel symbol display areas, but the upgrade trigger symbol that causes the symbol display area to grow may also be a "blast" trigger symbol that causes all cash-on-reel values that may be displayed in the symbol display area to pay out their values.

In some implementations, games of chance with upgradable aspects may include, for example, unlockable features. For example, different upgrade levels may be associated with different game features that may be unlocked, thereby enabling additional payout mechanisms. For example, a first upgrade may unlock a random wilds feature that may apply to outcomes in the base game. A second upgrade may enable a multiplier feature. And so forth. Each additional feature that is unlocked may be viewed as a different upgrade level, and the base game may use a different reel strip set for each upgrade level such that the total RTP of the game of chance remains the same regardless of upgrade level. The unlocked features may, in some cases, be reset after the feature game is triggered.

Main/feature games with persistent symbol position array growth are significantly different from typical main/feature games in that changes that occur to game play in the main game, e.g., the array growth, may persist and carry through to the feature game, thus also changing the underlying mechanics of the feature game. In a typical main game/feature game, modifications to the underlying mechanic of the main game are not carried through to any feature game, thereby allowing the feature game and the main game to effectively operate as separate games.

It will be appreciated that while much of the discussion above has focused on examples in the context of an electronic gaming machine, other gaming devices, e.g., smartphones, tablet computing devices, laptop or desktop computers, etc., may also be configured to provide similar implementations and are considered within the scope of this disclosure. It will also be appreciated that while the above examples have focused on the use/award of credits, similar implementations may use/award points, or some other quantifiable item, instead. Credits are to be understood to refer to cashable credits, e.g., credits that are redeemable for a national currency by the player, social gaming credits, e.g., credits that are not redeemable for a national currency by the player, or other similar types of credits.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A system comprising:

one or more displays; and a game controller that includes one or more processors and one or more memory devices, wherein:

the one or more processors, the one or more memory devices, and the one or more displays are operably connected, and the one or more memory devices store computer-executable instructions which, when executed, control the one or more processors to cause a reel symbol display area comprising a plurality of symbol positions to be displayed on one or more displays, wherein the symbol positions in the plurality of symbol positions are initially arranged in an array, and to, responsive to each receipt of a first input signal indicative of a game play of a main game:

select, in association with that game play of the main game, a symbol for each symbol position in the plurality of symbol positions from one of one or more sets of symbols associated with the main game, display, in each symbol position, the symbol selected for that symbol position in association with that game play of the main game, determine whether any of the symbols selected for display in association with that game play is an upgrade symbol or are upgrade symbols that, in being displayed, meet a growth condition, p3 cause, responsive to determining that the growth condition is met, a quantity of one or more additional symbol positions to be additionally displayed in the reel symbol display area and an additional symbol or additional symbols from the one set of symbols of the one or more sets of symbols to be displayed in the one or more additionally displayed symbol positions, determine whether any of the symbols selected for display in association with that game play is a feature game trigger symbol or are feature game trigger symbols that, in being displayed, meet a feature game trigger condition, cause, responsive to determining that the feature game trigger condition is met, a feature game to be presented using the symbol positions in the reel symbol display area, inclusive of any of the additionally displayed symbol positions, determine, responsive to receipt of one or more second input signals and in association with the presentation of the feature game, an outcome of the feature game, wherein each second input signal is indicative of a feature game play of the feature game, cause multiple user-selectable options to be presented on the one or more displays responsive to the feature game concluding, receive information indicating a selection of one of the user-selectable options, select, responsive to receiving the information indicating the selection of one of the user-selectable options, an expansion state effect from a set of multiple expansion state effects, the multiple expansion state effects including a first expansion state effect in which an expansion state of the reel symbol display area is decreased by one or more upgrade levels to reduce the number of additional symbol positions displayed therein and a second expansion state effect in which the expansion state of the reel symbol display area is reset to the array, and cause the reel symbol display area displayed on the one or more displays to be modified so as to implement the selected expansion state effect.

2. The system of claim 1, wherein, for at least one instance in which the growth condition is met, the quantity of one or more additional symbol positions that are additionally displayed in the reel symbol display area responsive to that instance in which the growth condition is determined to be met forms one or more additional columns of symbol positions that expand the array by the number of additional columns of symbol positions.

3. The system of claim 2, for at least one additional instance in which the growth condition is determined to be met, the quantity of one or more additional symbol positions that are additionally displayed in the reel symbol display area responsive to the additional instance in which the growth condition is met forms one or more additional rows of symbol positions that expand the array by the number of additional rows of symbol positions.

4. The system of claim 1, wherein, for at least one instance in which the growth condition is met, the quantity of one or more additional symbol positions that are additionally displayed in the reel symbol display area responsive to that instance in which the growth condition is determined to be met are added to a column of the array.

5. The system of claim 1, wherein, for at least one instance in which the growth condition is met, the quantity of one or more additional symbol positions that are additionally displayed in the reel symbol display area are duplicates of the symbol positions that were displayed in the reel symbol display area when the growth condition was met, wherein the additional symbol positions are arranged so as to replicate the arrangement of the symbol positions that were displayed in the reel symbol display area when the growth condition was met.

6. The system of claim 1, wherein the one or more memory devices further store additional computer-executable instructions which, when executed, further control the one or more processors to cause the symbol positions shown in the reel symbol display area to reset to the array responsive to the feature game concluding.

7. The system of claim 1, wherein the one or more memory devices further store additional computer-executable instructions which, when executed, further control the one or more processors to cause the reel symbol display area to reset to a state having fewer additional symbol positions responsive to the feature game concluding.

8. The system of claim 1, wherein the one or more memory devices further store additional computer-executable instructions which, when executed, further control the one or more processors to:

determine whether any of the symbols displayed in the additionally displayed symbol positions is an upgrade symbol or are upgrade symbols that, in being displayed in the additionally displayed symbol positions, meet a further growth condition, cause, responsive to determining that the further growth condition is met, a further quantity of one or more additional symbol positions to be additionally displayed in the reel symbol display area and a further additional symbol or additional symbols from the one set of symbols of the one or more sets of symbols to be displayed in the further quantity of one or more additionally displayed symbol positions.

9. The system of claim 1, wherein the multiple expansion state effects further include a third expansion state effect in which the expansion state of the reel symbol display area is raised by one or more upgrade levels to increase the number of additional symbol positions displayed therein.

10. The system of claim 9, wherein the multiple expansion state effects further include a fourth expansion state effect in which the expansion state of the reel symbol display area is reset to a maximum upgrade level to increase the number of additional symbol positions displayed therein to a maximum permitted by the main game.

11. One or more non-transitory, computer-readable media storing computer-executable instructions which, when executed by one or more processors, cause the one or more processors to:

cause a reel symbol display area comprising a plurality of symbol positions to be displayed on one or more displays, wherein the symbol positions in the plurality of symbol positions are initially arranged in an array, and, responsive to each receipt of a first input signal indicative of a game play of a main game:

select, in association with that game play of the main game, a symbol for each symbol position in the plurality of symbol positions from one of one or more sets of symbols associated with the main game, display, in each symbol position, the symbol selected for that symbol position in association with that game play of the main game, determine whether any of the symbols selected for display in association with that game play is an upgrade symbol or are upgrade symbols that, in being displayed, meet a growth condition, cause, responsive to determining that the growth condition is met, a quantity of one or more additional symbol positions to be additionally displayed in the reel symbol display area and an additional symbol or additional symbols from the one set of symbols of the one or more sets of symbols to be displayed in the one or more additionally displayed symbol positions, determine whether any of the symbols selected for display in association with that game play is a feature game trigger symbol or are feature game trigger symbols that, in being displayed, meet a feature game trigger condition, cause, responsive to determining that the feature game trigger condition is met, a feature game to be presented using the symbol positions in the reel symbol display area, inclusive of any of the additionally displayed symbol positions, determine, responsive to receipt of one or more second input signals and in association with the presentation of the feature game, an outcome of the feature game, wherein each second input signal is indicative of a feature game play of the feature game, cause multiple user-selectable options to be presented on the one or more displays responsive to the feature game concluding, receive information indicating a selection of one of the user-selectable options, select, responsive to receiving the information indicating the selection of one of the user-selectable options, an expansion state effect from a set of multiple expansion state effects, the multiple expansion state effects including a first expansion state effect in which an expansion state of the reel symbol display area is decreased by one or more upgrade levels to reduce the number of additional symbol positions displayed therein and a second expansion state effect in which the expansion state of the reel symbol display area is reset to the array, and cause the reel symbol display area displayed on the one or more displays to be modified so as to implement the selected expansion state effect.

12. The one or more non-transitory, computer-readable media of claim 11, wherein, for at least one instance in which the growth condition is met, the quantity of one or more additional symbol positions that are additionally displayed in the reel symbol display area responsive to that instance in which the growth condition is determined to be met forms one or more additional columns of symbol positions that expand the array by the number of additional columns of symbol positions.

13. The one or more non-transitory, computer-readable media of claim 12, wherein, for at least one additional instance in which the growth condition is met, the quantity of one or more additional symbol positions that are additionally displayed in the reel symbol display area responsive to the additional instance in which the growth condition is met forms one or more additional rows of symbol positions that expand the array by the number of additional rows of symbol positions.

14. The one or more non-transitory, computer-readable media of claim 11, wherein, for at least one instance in which the growth condition is met, the quantity of one or more additional symbol positions that are additionally displayed in the reel symbol display area responsive to that instance in which the growth condition is determined to be met are added to a column of the array.

15. The one or more non-transitory, computer-readable media of claim 11, wherein, for at least one instance in which the growth condition is met, the quantity of one or more additional symbol positions that are additionally displayed in the reel symbol display area are duplicates of the symbol positions that were displayed in the reel symbol display area when the growth condition was met, wherein the additional symbol positions are arranged so as to replicate the arrangement of the symbol positions that were displayed in the reel symbol display area when the growth condition was met.

16. The one or more non-transitory, computer-readable media of claim 11, further storing additional computer-executable instructions which, when executed by the one or more processors, further cause the one or more processors to cause the symbol positions shown in the reel symbol display area to reset to the array responsive to the feature game concluding.

17. The one or more non-transitory, computer-readable media of claim 11, further storing additional computer-executable instructions which, when executed by the one or more processors, further cause the one or more processors to cause the reel symbol display area to reset to a state having fewer additional symbol positions responsive to the feature game concluding.

18. The one or more non-transitory, computer-readable media of claim 11, further storing additional computer-executable instructions which, when executed by the one or more processors, further cause the one or more processors to:

determine whether any of the symbols displayed in the additionally displayed symbol positions is an upgrade symbol or are upgrade symbols that, in being displayed in the additionally displayed symbol positions, meet a further growth condition, cause, responsive to determining that the further growth condition is met, a further quantity of one or more additional symbol positions to be additionally displayed in the reel symbol display area and a further additional symbol or additional symbols from the one set of symbols of the one or more sets of symbols to be displayed in the further quantity of one or more additionally displayed symbol positions.

19. The one or more non-transitory, computer-readable media of claim 11, wherein the multiple expansion state effects further include a third expansion state effect in which the expansion state of the reel symbol display area is raised by one or more upgrade levels to increase the number of additional symbol positions displayed therein.

20. The one or more non-transitory, computer-readable media of claim 19, wherein the multiple expansion state effects further include a fourth expansion state effect in which the expansion state of the reel symbol display area is reset to a maximum upgrade level to increase the number of additional symbol positions displayed therein to a maximum permitted by the main game.

* * * * *